(12) United States Patent
Rodriguez

(10) Patent No.: US 10,485,312 B2
(45) Date of Patent: Nov. 26, 2019

(54) PROTECTIVE CASE SYSTEM WITH STAND

(71) Applicant: Otter Products, LLC, Fort Collins, CO (US)

(72) Inventor: Richard Rodriguez, Fort Collins, CO (US)

(73) Assignee: Otter Products, LLC, Fort Collins, CO (US)

( * ) Notice: Subject to any disclaimer, the term of this patent is extended or adjusted under 35 U.S.C. 154(b) by 266 days.

(21) Appl. No.: 15/686,228

(22) Filed: Aug. 25, 2017

(65) Prior Publication Data

US 2018/0055166 A1 Mar. 1, 2018

Related U.S. Application Data

(60) Provisional application No. 62/381,326, filed on Aug. 30, 2016.

(51) Int. Cl.
*G06F 1/16* (2006.01)
*H04M 1/04* (2006.01)
(Continued)

(52) U.S. Cl.
CPC ............... *A45C 11/00* (2013.01); *A45F 5/00* (2013.01); *F16M 11/041* (2013.01);
(Continued)

(58) Field of Classification Search
CPC ............. A45C 11/00; A45C 2011/001; A45C 2011/002; A45C 2011/003;
(Continued)

(56) References Cited

U.S. PATENT DOCUMENTS 3,023,885 A 3/1962 Kindseth
4,029,999 A 6/1977 Neumann et al.
(Continued)

FOREIGN PATENT DOCUMENTS

CN 202488509 U 10/2012
KR 200446444 10/2009
(Continued)

OTHER PUBLICATIONS

Outfityours.com (Top 5 Best Clear iPhone 5S and iPhone 5 Cases—Incase, Otterbox, Griffin, Moshi [retrieved from https://www.youtube.com/watch?v=rWYKJvsDHPw],YouTube.com [online], May 17, 2013 [retrieved Oct. 11, 2017}, 3 pages.
(Continued)

*Primary Examiner* — Gideon R Weinerth

(57) ABSTRACT

A protective case system includes a protective case and a stand. The protective case at least partially encases an electronic device and has an outer shell that includes a first mounting feature. The stand has a second mounting feature and a third mounting feature. The first mounting feature of the protective case is complementary to and removably attachable to the second mounting feature of the stand for holding the protective case and the electronic device in a non-horizontal viewing position. The third mounting feature of the stand is configured to removably attach to a mounting feature of an accessory device. The third mounting feature of the stand having the same mechanical configuration or interface as the first mounting feature of the protective case and being complementary to the mounting feature of the accessory device.

8 Claims, 15 Drawing Sheets

(51) Int. Cl.
   *A45C 11/00* (2006.01)
   *F16M 13/00* (2006.01)
   *F16M 11/04* (2006.01)
   *A45F 5/00* (2006.01)

(52) U.S. Cl.
   CPC ... *A45C 2011/001* (2013.01); *A45C 2011/002* (2013.01); *A45C 2011/003* (2013.01); *A45C 2200/15* (2013.01); *A45F 2200/0516* (2013.01); *A45F 2200/0525* (2013.01); *F16M 13/00* (2013.01); *G06F 1/1601* (2013.01); *G06F 1/1632* (2013.01); *G06F 1/1688* (2013.01); *H04M 1/04* (2013.01)

(58) Field of Classification Search
   CPC ............ A45C 2200/15; A45F 5/00; A45F 2200/0516; A47B 97/04; A47B 97/08; A47B 2097/006; F16M 11/041; F16M 11/24; F16M 11/048; F16M 11/105; F16M 13/00; F16M 13/022; F16M 2200/08; G06F 2200/1633; G06F 1/626; G06F 1/1632; G06F 1/1656; G06F 1/1607; G06F 1/1688; H04B 1/3888; H04M 1/04; H04M 1/0202; H04M 1/185; H04M 1/0249; H04M 1/72527; H04R 2205/021; H05K 5/0217; B65D 5/5206
   USPC ........ 40/745–753; 248/460, 441.1, 461, 462, 248/464, 465, 451, 448, 454, 455, 346.01, 248/34, 6.06, 346.03; 206/320, 701, 206/45.24, 775; 244/191; 705/16, 17, 705/21; 455/575.8, 557, 575.1, 550.1; 361/679.41, 679.02, 679.3, 679.43, 361/679.56; 312/223.1, 223.2, 223.4
   See application file for complete search history.

(56) References Cited

U.S. PATENT DOCUMENTS

| | | | |
|---|---|---|---|
| 4,097,878 A | | 6/1978 | Cramer |
| 4,584,718 A | | 4/1986 | Fuller |
| 4,856,658 A | * | 8/1989 | Novak ............... F16M 13/00 211/26.1 |
| 4,925,146 A | * | 5/1990 | Hegarty ............... A47B 19/10 248/447 |
| 4,933,988 A | * | 6/1990 | Thibault ............... H04B 1/088 455/349 |
| 4,981,243 A | * | 1/1991 | Rogowski ............ B62J 11/00 224/431 |
| 5,025,921 A | | 6/1991 | Gasparaitis et al. |
| 5,123,044 A | | 6/1992 | Tate |
| 5,138,523 A | | 8/1992 | Benck et al. |
| 5,360,108 A | | 11/1994 | Alagia |
| 5,368,159 A | | 11/1994 | Doria |
| 5,380,968 A | | 1/1995 | Morse |
| 5,383,091 A | | 1/1995 | Snell |
| 5,386,084 A | | 1/1995 | Risko |
| 5,388,691 A | | 2/1995 | White |
| 5,388,692 A | | 2/1995 | Withrow et al. |
| D365,927 S | | 1/1996 | Cho |
| 5,508,479 A | | 4/1996 | Schooley |
| 5,541,813 A | | 7/1996 | Satoh et al. |
| 5,671,120 A | | 9/1997 | Kikinisi |
| 6,097,593 A | * | 8/2000 | Faranda ............. G06F 1/1616 361/679.23 |
| 6,115,248 A | | 9/2000 | Canova et al. |
| 6,151,206 A | * | 11/2000 | Kato ............... G06F 1/1601 361/679.26 |
| 6,311,017 B1 | | 10/2001 | Mori |
| 6,317,313 B1 | | 11/2001 | Mosgrove et al. |
| 6,349,824 B1 | | 2/2002 | Yamada |
| 6,375,009 B1 | | 4/2002 | Lee |
| 6,445,577 B1 | | 9/2002 | Madsen et al. |
| 6,456,487 B1 | | 9/2002 | Hetterick |
| 6,490,155 B2 | | 12/2002 | Han et al. |
| 6,545,862 B1 | | 4/2003 | Gettemy et al. |
| 6,616,111 B1 | | 9/2003 | White |
| 6,625,394 B2 | | 9/2003 | Smith et al. |
| 6,626,362 B1 | | 9/2003 | Steiner et al. |
| 6,701,159 B1 | | 3/2004 | Powell |
| 6,762,935 B2 | | 7/2004 | Hidewasa |
| 6,865,076 B2 | | 3/2005 | Lunsford |
| 6,966,519 B2 | | 11/2005 | Salentine et al. |
| 7,050,841 B1 | | 5/2006 | Onda |
| 7,072,699 B2 | | 7/2006 | Eiden |
| D526,780 S | | 8/2006 | Richardson et al. |
| 7,145,767 B2 | * | 12/2006 | Mache ............... F16M 11/046 361/679.21 |
| 7,194,291 B2 | | 3/2007 | Peng |
| D542,524 S | | 5/2007 | Richardson et al. |
| 7,236,588 B2 | | 6/2007 | Gartrell |
| 7,343,184 B2 | | 3/2008 | Rostami |
| 7,359,184 B2 | | 4/2008 | Lord |
| D574,819 S | | 8/2008 | Andre et al. |
| D581,155 S | | 11/2008 | Richardson et al. |
| D581,421 S | | 11/2008 | Richardson et al. |
| D587,008 S | | 2/2009 | Richardson et al. |
| D589,016 S | | 3/2009 | Richardson et al. |
| 7,555,325 B2 | | 6/2009 | Goros |
| 7,558,594 B2 | | 7/2009 | Wilson |
| 7,688,580 B2 | | 3/2010 | Richardson et al. |
| 7,845,608 B1 | * | 12/2010 | Chen ............... G06F 1/181 248/297.21 |
| 7,889,489 B2 | | 2/2011 | Richardson et al. |
| 7,907,394 B2 | | 3/2011 | Richardson et al. |
| 7,933,122 B2 | | 4/2011 | Richardson et al. |
| 8,049,727 B2 | | 11/2011 | Hanson et al. |
| 8,204,561 B2 | | 6/2012 | Mongan et al. |
| 8,442,604 B1 | | 5/2013 | Diebel |
| 8,453,344 B2 | | 6/2013 | Nishiwaki et al. |
| 8,457,701 B2 | | 6/2013 | Diebel |
| 8,490,783 B1 | | 7/2013 | Fan |
| 8,509,865 B1 | | 8/2013 | LaColla et al. |
| 8,560,031 B2 | | 10/2013 | Barnett et al. |
| 8,567,599 B2 | | 10/2013 | Beatty et al. |
| 8,599,547 B2 | | 12/2013 | Richardson et al. |
| 8,676,281 B1 | | 3/2014 | Caulder et al. |
| 8,755,852 B2 | | 6/2014 | Hynecek et al. |
| 8,777,002 B2 | | 7/2014 | Thomas et al. |
| 8,798,675 B2 | | 8/2014 | Salmon et al. |
| 8,800,762 B2 | | 8/2014 | Fathollahi |
| 8,965,458 B2 | | 2/2015 | Richardson et al. |
| 9,008,738 B1 | | 4/2015 | Dong |
| 9,060,580 B2 | | 6/2015 | Tages |
| 9,089,056 B2 | | 7/2015 | Rayner |
| 9,098,238 B2 | | 8/2015 | Richardson et al. |
| 9,125,297 B2 | | 9/2015 | Magness |
| 9,136,897 B2 | | 9/2015 | Hynecek et al. |
| 9,153,112 B1 | * | 10/2015 | Kiani ............... G08B 13/22 |
| 9,226,057 B1 | * | 12/2015 | Davis ............... H04R 1/026 |
| 9,266,664 B2 | | 2/2016 | Bau |
| 9,274,556 B2 | * | 3/2016 | Gallouzi ............... F16M 11/041 |
| 9,295,174 B2 | | 3/2016 | Witter et al. |
| 9,316,026 B2 | | 4/2016 | Myers et al. |
| 9,367,090 B2 | | 6/2016 | Barnett et al. |
| 9,377,154 B2 | * | 6/2016 | Hung ............... F16M 11/046 |
| D762,258 S | * | 7/2016 | Jenkins ............... D18/4.5 |
| 9,408,448 B2 | | 8/2016 | Kay et al. |
| D766,226 S | | 9/2016 | Wu |
| D766,227 S | | 9/2016 | Wu |
| D769,855 S | | 10/2016 | Deng |
| 9,462,099 B2 | | 10/2016 | Wilson et al. |
| 9,481,490 B2 | | 11/2016 | Venida et al. |
| 9,487,376 B2 | | 11/2016 | Salentine et al. |
| 9,503,147 B2 | | 11/2016 | Witter et al. |
| 9,537,526 B2 | | 1/2017 | Wilson et al. |
| 9,545,140 B1 | | 1/2017 | Johnson et al. |
| 9,615,476 B2 | | 4/2017 | Rayner et al. |
| 9,622,556 B2 | | 4/2017 | Fathollahi et al. |
| 9,654,605 B2 | | 5/2017 | Goldfain et al. |
| 9,660,684 B2 | | 5/2017 | Rayner |

(56) References Cited

U.S. PATENT DOCUMENTS

| | | |
|---|---|---|
| 9,743,540 B2 | 8/2017 | Magness |
| 9,774,713 B2 | 9/2017 | Guerdrum et al. |
| 9,788,620 B1 | 10/2017 | Parkinson |
| 9,807,211 B2 | 10/2017 | Guerdrum et al. |
| 9,851,758 B2 * | 12/2017 | Rowley ............... G06F 1/166 |
| D808,376 S | 1/2018 | Kim |
| D808,377 S | 1/2018 | Witter et al. |
| 9,871,550 B2 | 1/2018 | Witter et al. |
| D824,376 S | 7/2018 | Lee |
| 10,027,783 B2 | 7/2018 | Dukerschein et al. |
| 10,058,155 B2 | 8/2018 | Guerdrum et al. |
| D827,627 S | 9/2018 | Lee |
| D829,700 S | 10/2018 | Kim |
| 10,103,769 B2 | 10/2018 | Witter et al. |
| 10,136,716 B2 | 11/2018 | Northrup et al. |
| 10,178,903 B2 | 1/2019 | Guerdrum et al. |
| 10,206,472 B1 | 2/2019 | Northrup et al. |
| 2001/0054594 A1 * | 12/2001 | Maier-Hunke ........... G09F 1/12 211/47 |
| 2002/0065054 A1 | 5/2002 | Humphreys et al. |
| 2002/0079244 A1 | 6/2002 | Kwong |
| 2004/0150945 A1 * | 8/2004 | Mache ............ F16M 11/046 361/679.21 |
| 2005/0088811 A1 | 4/2005 | Ulla et al. |
| 2005/0213298 A1 * | 9/2005 | Doherty ............ G06F 1/1632 361/679.44 |
| 2005/0224508 A1 | 10/2005 | Tajiri et al. |
| 2005/0279661 A1 | 12/2005 | Hodges |
| 2006/0027718 A1 * | 2/2006 | Quijano ............ F16M 11/14 248/121 |
| 2006/0066438 A1 * | 3/2006 | Altounian ............ G06F 21/86 340/5.53 |
| 2006/0172765 A1 | 8/2006 | Lev |
| 2006/0237495 A1 | 10/2006 | Chen et al. |
| 2006/0243679 A1 * | 11/2006 | Dickerson ............ B42D 5/005 211/10 |
| 2006/0255493 A1 | 11/2006 | Fouladpour |
| 2007/0071423 A1 | 3/2007 | Fantone et al. |
| 2007/0115387 A1 | 5/2007 | Ho |
| 2007/0146985 A1 | 6/2007 | Mick et al. |
| 2007/0158220 A1 | 7/2007 | Cleereman et al. |
| 2007/0297149 A1 | 12/2007 | Richardson et al. |
| 2008/0117578 A1 * | 5/2008 | Moscovitch ........ F16M 11/105 361/679.04 |
| 2008/0163463 A1 | 7/2008 | Hulden |
| 2008/0304692 A1 * | 12/2008 | Zhang ............... H04R 1/025 381/387 |
| 2009/0001232 A1 * | 1/2009 | Seo ................ G06F 1/1616 248/176.1 |
| 2009/0034169 A1 | 2/2009 | Richardson et al. |
| 2009/0079665 A1 * | 3/2009 | Moscovitch ........ F16M 11/10 345/1.3 |
| 2009/0161903 A1 * | 6/2009 | White ................ H04R 1/02 381/395 |
| 2009/0237377 A1 | 9/2009 | Lai et al. |
| 2009/0283184 A1 | 11/2009 | Han |
| 2010/0006468 A1 | 1/2010 | Lin |
| 2010/0090085 A1 * | 4/2010 | Corrion ............ A47B 23/043 248/459 |
| 2010/0093412 A1 | 4/2010 | Serra et al. |
| 2010/0122756 A1 | 5/2010 | Longinotti-Buitoni |
| 2010/0141864 A1 * | 6/2010 | Lai ................. F16M 11/22 349/58 |
| 2010/0147737 A1 | 6/2010 | Richardson et al. |
| 2010/0195279 A1 * | 8/2010 | Michael ............ G06F 1/1632 361/679.41 |
| 2010/0203931 A1 | 8/2010 | Hynecek et al. |
| 2010/0215188 A1 * | 8/2010 | Wilcox ............ B60R 11/0241 381/86 |
| 2010/0230301 A1 | 9/2010 | Fellig |
| 2011/0064401 A1 | 3/2011 | DeSorbo |
| 2011/0075349 A1 * | 3/2011 | Ma ................. G06F 1/1632 361/679.41 |
| 2011/0170256 A1 * | 7/2011 | Lee ................. G04G 17/086 361/679.44 |
| 2011/0192857 A1 | 8/2011 | Rothbaum et al. |
| 2011/0216495 A1 * | 9/2011 | Marx ................. H05K 5/02 361/679.22 |
| 2011/0228459 A1 | 9/2011 | Richardson et al. |
| 2011/0235846 A1 * | 9/2011 | Jiang ................ G11B 33/025 381/386 |
| 2011/0294556 A1 | 12/2011 | Carlberg et al. |
| 2012/0018325 A1 | 1/2012 | Kim |
| 2012/0031788 A1 | 2/2012 | Mongan et al. |
| 2012/0037524 A1 | 2/2012 | Thomas et al. |
| 2012/0037536 A1 | 2/2012 | Thomas et al. |
| 2012/0106069 A1 * | 5/2012 | Strauser ............ G06F 1/1632 361/679.41 |
| 2012/0111881 A1 | 5/2012 | Scott et al. |
| 2012/0170194 A1 * | 7/2012 | Lord ................ G06F 1/1632 361/679.02 |
| 2012/0287565 A1 | 11/2012 | Bennett |
| 2013/0027862 A1 | 1/2013 | Rayner |
| 2013/0039521 A1 * | 2/2013 | Zhou ................ G06F 1/1626 381/333 |
| 2013/0083953 A1 * | 4/2013 | Chang ............... G06F 1/1628 381/333 |
| 2013/0088813 A1 | 4/2013 | Su et al. |
| 2013/0098788 A1 | 4/2013 | McCarville et al. |
| 2013/0107449 A1 * | 5/2013 | Su ................. F16M 11/041 361/679.56 |
| 2013/0109253 A1 * | 5/2013 | Gammon ............ F16M 11/10 439/883 |
| 2013/0117487 A1 * | 5/2013 | Leung ............... G06F 1/1632 710/303 |
| 2013/0126533 A1 | 5/2013 | Klosky |
| 2013/0175186 A1 | 7/2013 | Simmer |
| 2013/0177181 A1 * | 7/2013 | Marcus .............. H04R 1/02 381/189 |
| 2013/0220841 A1 | 8/2013 | Yang |
| 2013/0220847 A1 | 8/2013 | Fisher et al. |
| 2013/0222989 A1 * | 8/2013 | Chen ................... G06F 1/16 361/679.02 |
| 2013/0230202 A1 * | 9/2013 | Widner ............... H04R 5/02 381/333 |
| 2013/0240578 A1 | 9/2013 | Yu |
| 2013/0262248 A1 * | 10/2013 | Kim ................. G07G 1/0018 705/17 |
| 2013/0292269 A1 | 11/2013 | Tages |
| 2013/0292288 A1 | 11/2013 | Willes |
| 2014/0003647 A1 * | 1/2014 | Liu ................. H04R 1/026 381/386 |
| 2014/0049142 A1 | 2/2014 | Magness |
| 2014/0065847 A1 | 3/2014 | Salmon et al. |
| 2014/0080553 A1 | 3/2014 | Torset et al. |
| 2014/0097102 A1 | 4/2014 | Piatt et al. |
| 2014/0099526 A1 | 4/2014 | Powell et al. |
| 2014/0128132 A1 | 5/2014 | Cox |
| 2014/0141838 A1 | 5/2014 | Cai et al. |
| 2014/0152890 A1 | 6/2014 | Rayner |
| 2014/0166707 A1 | 6/2014 | Leisey-Bartsch |
| 2014/0168884 A1 * | 6/2014 | Wylie ............... G06F 1/1654 361/679.43 |
| 2014/0183064 A1 | 7/2014 | Ge |
| 2014/0183065 A1 | 7/2014 | Toulotte |
| 2014/0187289 A1 | 7/2014 | Cataldo et al. |
| 2014/0200056 A1 * | 7/2014 | Liu ................. H04B 1/3877 455/575.8 |
| 2014/0227026 A1 | 8/2014 | O'Neill et al. |
| 2014/0228074 A1 | 8/2014 | Kulkarni et al. |
| 2014/0262848 A1 | 9/2014 | Fathollahi et al. |
| 2014/0262934 A1 | 9/2014 | Fathollahi et al. |
| 2014/0265765 A1 | 9/2014 | Khodapanah et al. |
| 2014/0265767 A1 | 9/2014 | Fathollahi |
| 2014/0299488 A1 | 10/2014 | Andrew |
| 2014/0302896 A1 | 10/2014 | Xu et al. |
| 2015/0061477 A1 | 3/2015 | Wilson |
| 2015/0062787 A1 | 3/2015 | Wilson et al. |
| 2015/0068935 A1 | 3/2015 | Kay et al. |
| 2015/0083615 A1 | 3/2015 | Lay et al. |
| 2015/0111623 A1 | 4/2015 | Hegemier et al. |

(56) References Cited

U.S. PATENT DOCUMENTS

| | | |
|---|---|---|
| 2015/0133183 A1 | 5/2015 | Alameh et al. |
| 2015/0141090 A1 | 5/2015 | Hwan et al. |
| 2015/0141095 A1 | 5/2015 | Kim |
| 2015/0172431 A1 | 6/2015 | Huang |
| 2015/0189160 A1* | 7/2015 | Auger ............... H04N 5/23216 348/142 |
| 2015/0194997 A1 | 7/2015 | Johnson et al. |
| 2015/0194998 A1 | 7/2015 | Fathollahi |
| 2015/0195938 A1 | 7/2015 | Witter et al. |
| 2015/0201723 A1 | 7/2015 | Rayner et al. |
| 2015/0214989 A1* | 7/2015 | Yeh ..................... H04B 1/3877 455/575.1 |
| 2015/0220766 A1 | 8/2015 | Russell et al. |
| 2015/0257285 A1 | 9/2015 | Wilson et al. |
| 2015/0257287 A1 | 9/2015 | Tages |
| 2015/0304466 A1* | 10/2015 | Tamatsu ................ H04M 1/04 379/447 |
| 2016/0007705 A1 | 1/2016 | Liebers et al. |
| 2016/0036478 A1* | 2/2016 | Wong ................... H02J 7/0044 455/573 |
| 2016/0072933 A1 | 3/2016 | Cox |
| 2016/0080024 A1 | 3/2016 | Wilson et al. |
| 2016/0122821 A1 | 5/2016 | Liu et al. |
| 2016/0142093 A1 | 5/2016 | Phang |
| 2016/0164565 A1 | 6/2016 | Witter et al. |
| 2016/0179143 A1* | 6/2016 | Bidwell ................ G06F 1/1656 361/679.4 |
| 2016/0183392 A1* | 6/2016 | Kelley .................... F16L 3/12 211/26 |
| 2016/0195898 A1* | 7/2016 | Lau ......................... H04M 1/04 361/679.41 |
| 2016/0198822 A1* | 7/2016 | Lee ....................... G06F 1/1656 224/235 |
| 2016/0254836 A1 | 9/2016 | Alsberg et al. |
| 2016/0261133 A1 | 9/2016 | Wang |
| 2016/0282905 A1* | 9/2016 | Laine .................... G06F 1/1632 |
| 2016/0286920 A1 | 10/2016 | Lean et al. |
| 2016/0286921 A1 | 10/2016 | Northrup et al. |
| 2016/0295981 A1 | 10/2016 | Lay et al. |
| 2017/0026498 A1 | 1/2017 | Goldfain et al. |
| 2017/0041037 A1 | 2/2017 | Witter et al. |
| 2017/0099922 A1 | 4/2017 | Guerdrum et al. |
| 2017/0099924 A1 | 4/2017 | Fathollahi et al. |
| 2017/0119120 A1 | 5/2017 | Richardson et al. |
| 2017/0237460 A1 | 8/2017 | Rayner |
| 2017/0279478 A1 | 9/2017 | Fathollahi |
| 2017/0327054 A1* | 11/2017 | Yu ............................. G06F 1/16 |
| 2017/0328517 A1* | 11/2017 | Wessels ............... F16M 11/041 |
| 2017/0353208 A1 | 12/2017 | Wilson et al. |
| 2017/0359096 A1 | 12/2017 | Witter et al. |
| 2017/0360200 A1* | 12/2017 | Cohen .................... A47B 97/08 |
| 2018/0136695 A1* | 5/2018 | Lo ......................... G06F 1/1632 |
| 2018/0167498 A1* | 6/2018 | Drakos ................. F16M 11/105 |
| 2018/0314295 A1* | 11/2018 | D'Penha ............... G06F 1/1632 |
| 2018/0369599 A1* | 12/2018 | Smith ..................... A61N 1/3975 |
| 2019/0094853 A1* | 3/2019 | Overall ................ F16M 11/041 |
| 2019/0141848 A1* | 5/2019 | Sung ..................... G06F 1/1607 |
| 2019/0212774 A1* | 7/2019 | Patterson .............. G06F 1/1626 |
| 2019/0222682 A1* | 7/2019 | Ren ....................... H04B 1/3833 |
| 2019/0250664 A1* | 8/2019 | Eslava ................... A61B 5/002 |
| 2019/0281147 A1* | 9/2019 | Sherburne .............. H04M 1/04 |
| 2019/0286191 A1* | 9/2019 | Correll, Jr. ............ G06F 1/1656 |

FOREIGN PATENT DOCUMENTS

| | | |
|---|---|---|
| KR | 101394285 | 5/2014 |
| WO | 1994000037 A1 | 1/1994 |
| WO | 1999041958 A1 | 8/1999 |
| WO | 2015103599 A1 | 7/2015 |

OTHER PUBLICATIONS

Randomrazr (NEW Otterbox Symmetry Case—The Slim Protective Case for the iPhone 5S/5C [retrieved from https://wwwyoutube.com/watch?v=zGWZTGamuT0], YouTube.com [online], Mar. 30, 2014 [retrieved Oct. 11, 2017]), 5 pages.

\* cited by examiner

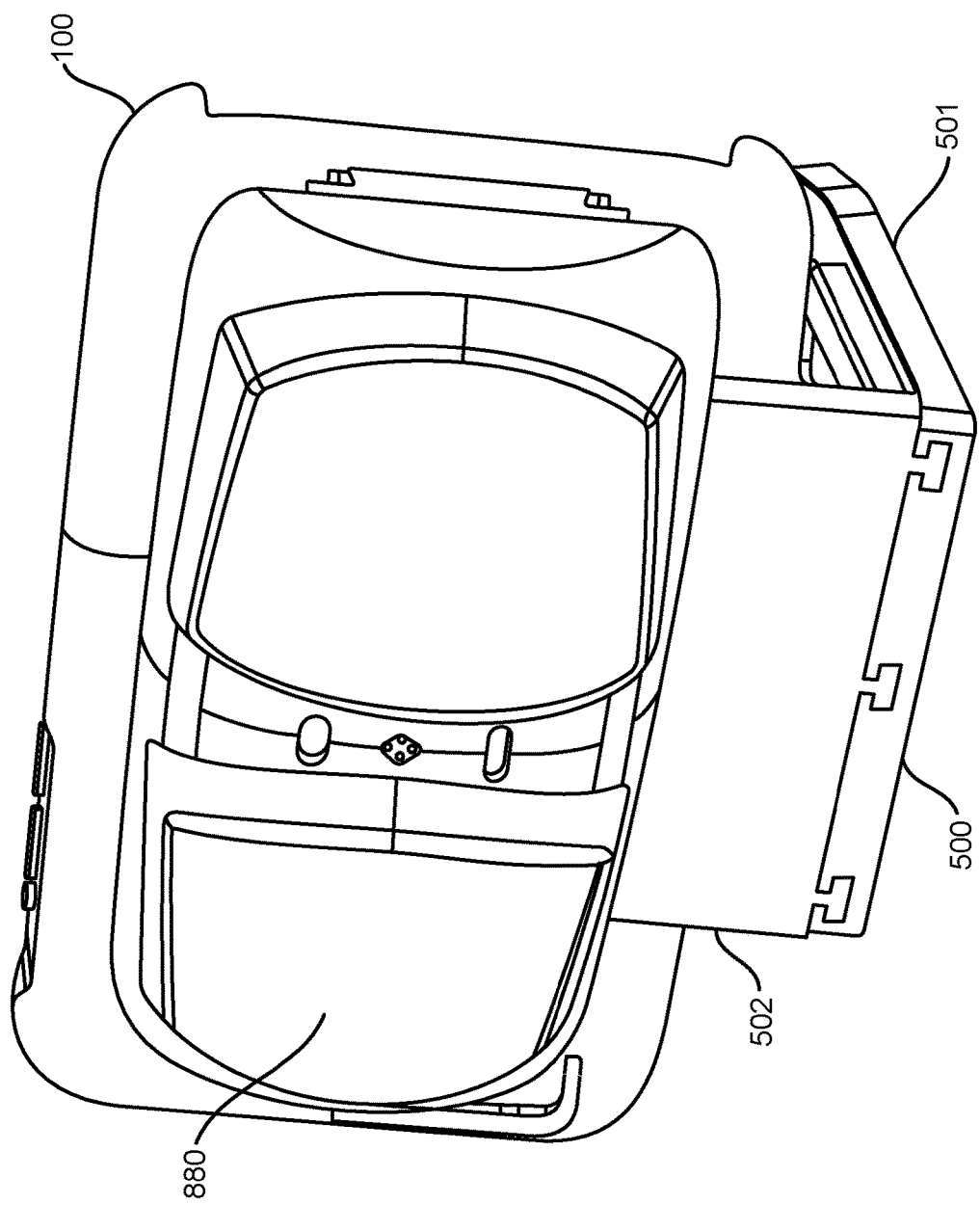

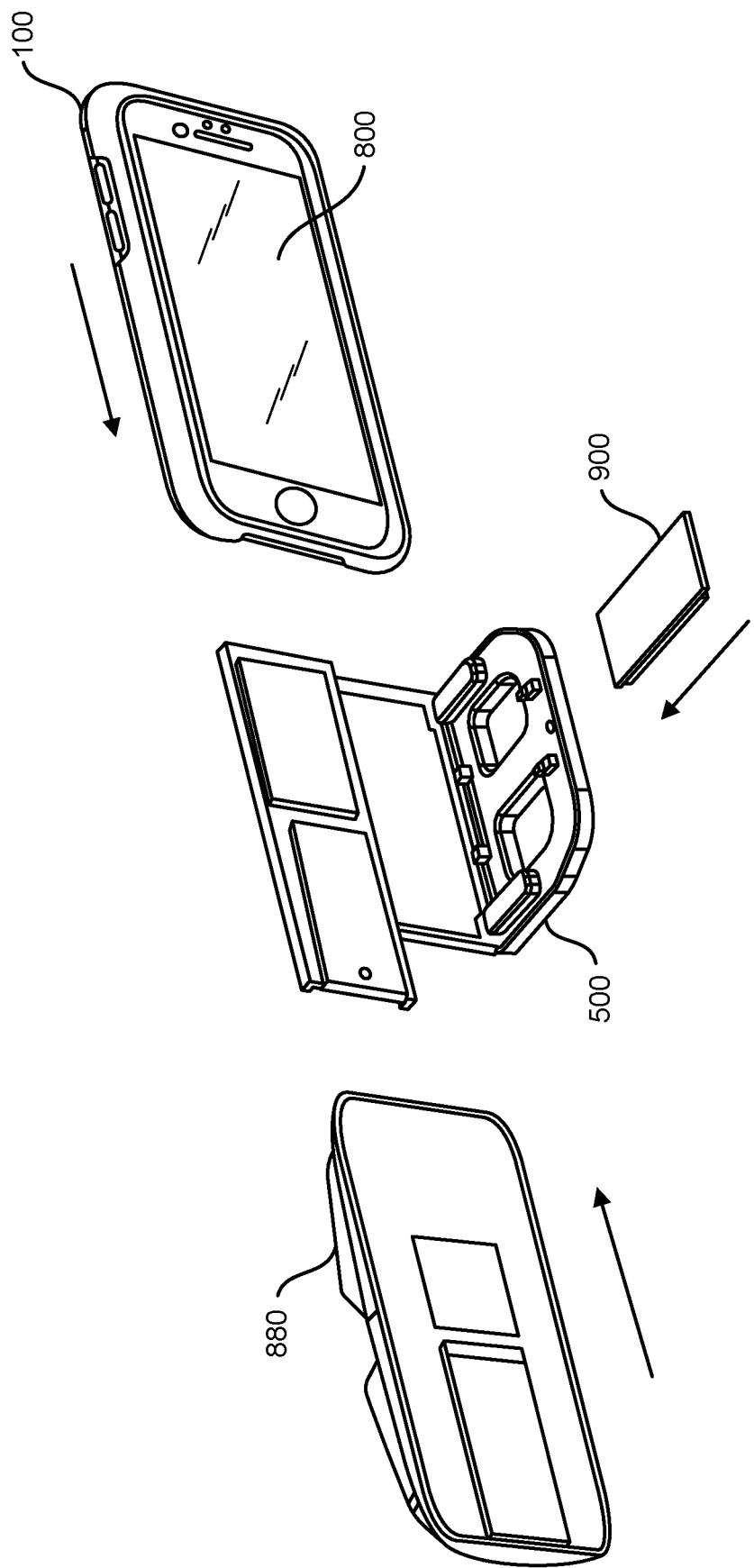

PROTECTIVE CASE SYSTEM WITH STAND

CROSS REFERENCE TO RELATED APPLICATIONS

This application claims priority to U.S. Provisional Application No. 62/381,326, filed Aug. 30, 2016, the disclosures of which are hereby incorporated by reference in their entirety.

BACKGROUND

Personal electronic devices are commonly used for communication, entertainment, and Internet access, as well as for a variety of other purposes. Examples of personal electronic devices include smartphones, tablet computers, gaming devices, audio players, video players, cameras, portable computers, two-way radios, GPS receivers, and/or other portable devices. As processing power, screen resolution, and other features increase, these devices are being used for an increasingly wide range of purposes. As these devices become an increasingly important part of peoples' daily activities, it is desirable to have protective cases that not only protect the electronic devices from damage, but also help flexibly adapt the devices to serve other useful purposes and/or perform other functions. In some situations, personal electronic devices are used for audio and/or video purposes and a user may wish to not hold the device in position in his or her hand during the entire period of use.

BRIEF DESCRIPTION OF THE DRAWINGS

FIG. 6A illustrates a perspective view of a stand with an accessory and a protective case attached;
FIG. 8 illustrates an unassembled view of the components of FIGS. 6A and 6B.

DETAILED DESCRIPTION

Figure 1:
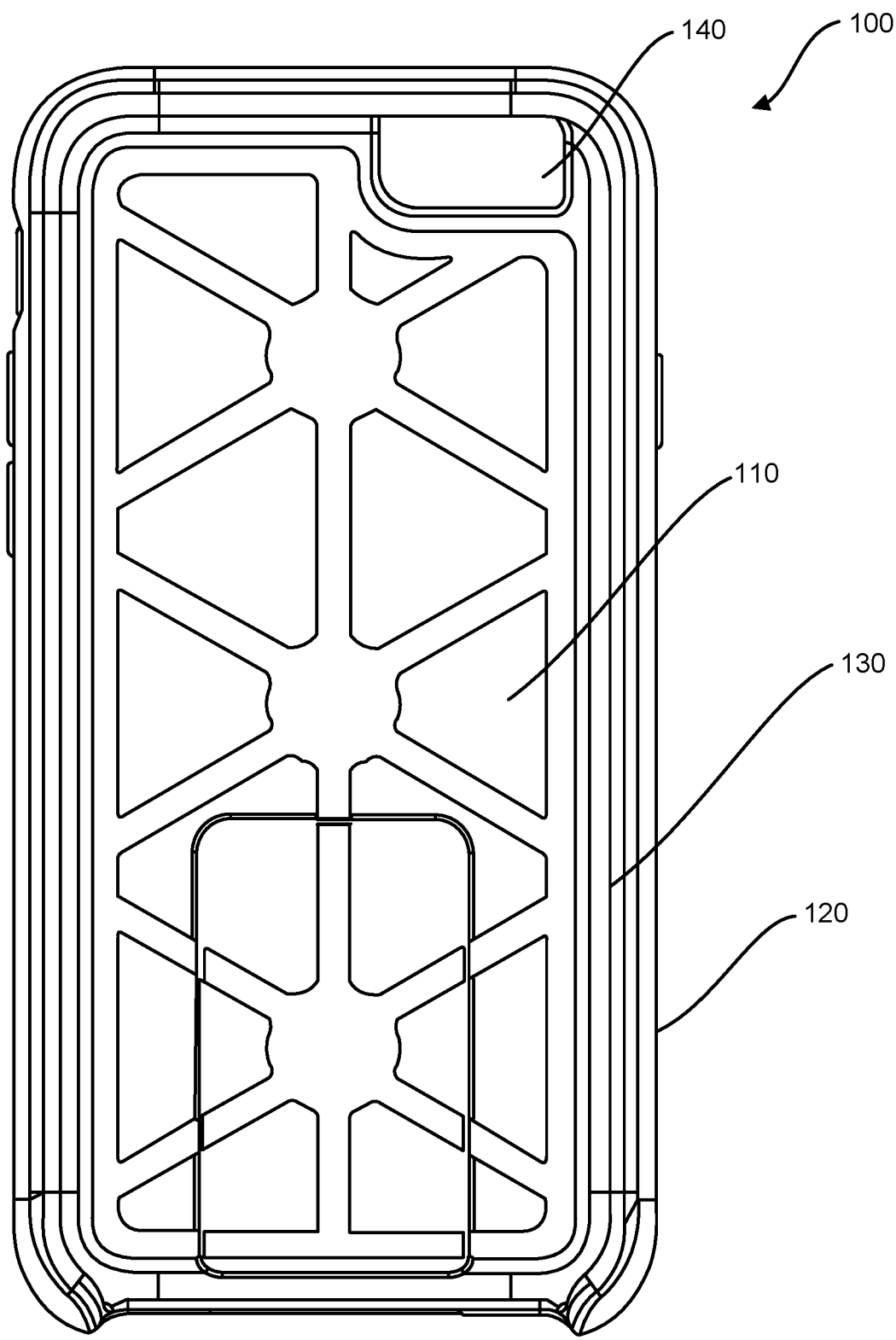
FIG. 1 illustrates a protective case.

Electronic devices are increasingly used with protective cases that protect the electronic devices from a variety or forces or elements such as: dropping, impact, scratching, water, dirt, dust, rain, snow, and/or chemicals. As people carry electronic devices with them more frequently and become more interested in using them for a wider variety of tasks, there is an increasing desire to adapt the functionality of these electronic devices using external modules that provide different functions than those originally provided in the electronic device and/or in the protective case. Removable modules allow a user to adapt or configure their electronic device to perform a number of new or different functions. Some of these removable modules may have electrical and/or electronic functions and may need to have an electrical interconnection to the electronic device and/or to the protective case. However, some removable modules may not require an electrical connection to one or both of the electronic device and the protective case. In some examples, a removable module may communicate with the electronic device and/or the protective case using one or more types of wireless communication technology.

In some situations, it may be desirable to attach, detach, and/or use removable modules with an electronic device without taking the electronic device out of the protective case. Modules may include features and functions such as, but not limited to: communication functions, a supplemental camera, a flash, a lens, a battery, a power source, a power adapter, a solar panel, a game interface, a supplemental display, a sensor, a measurement device, a monitoring apparatus, a medical measurement device, a medical analysis device, an audio component, a speaker, a video component, a mounting interface, a mounting function, a storage feature, a mechanical interface, a compartment for storing other objects, an electrical function, an additional electrical interface, and/or a decorative/ornamental attachment. Many other modules, features, and functions are possible and the improvements described herein are not to be limited to any particular type of module or module function.

In some situations, a user may wish to keep the electronic device in a particular orientation for a period of time without having to hold it or hold it in position for the entire period. For example, this may occur when a user is watching video content on the electronic device. In other situations, a user may wish to have the device held in an improved or optimized position for other purposes, such as for directing audio in a preferred direction. Consequently, there are opportunities for improved stands and/or holders that hold personal electronic devices, as well as providing compatibility with one or more of the protective cases, mounting schemes, and/or accessories associated with the electronic device as described herein.

While most of the electronic device cases disclosed herein are described as "protective" cases, the apparatuses and techniques disclosed herein related do not necessarily require that the case is protective and could apply to any type of electronic device case, cover, sleeve, sheath, attachment panel, etc. In other examples, the case may be water resistant or water proof for protecting the electronic device from water or other liquids. In yet other examples, the case may have other characteristics, such as but not limited to, chemical resistance and antimicrobial characteristics. Moreover, while the electronic device cases disclosed herein are generally understood to serve as after-market accessories for original equipment electronic devices (i.e., smartphones, tablet computers, gaming devices, audio players, video players, cameras, portable computers, two-way radios, GPS receivers, other portable devices, etc.), the apparatuses and techniques described herein could also be applied to the actual housings of original equipment electronic devices themselves.

In one example, a protective case system includes a protective case and a stand. The protective case at least partially encases an electronic device and has an outer shell that includes a first mounting feature. The stand has a second mounting feature and a third mounting feature. The first mounting feature of the protective case is complementary to and removably attachable to the second mounting feature of the stand for holding the protective case and the electronic device in a non-horizontal viewing position. The third mounting feature of the stand is configured to removably attach to a mounting feature of an accessory device. The third mounting feature of the stand having the same mechanical configuration or interface as the first mounting feature of the protective case and being complementary to the mounting feature of the accessory device. While the invention is primarily described in terms of a system, the invention may also comprise any one or more of the individual components described herein.

In another example, a stand for supporting an accessory and a protective case for an electronic device installed in the protective case is provided. The stand has a first portion for supporting the stand and a second portion. The second portion is configured to releasably attach to the accessory and to the protective case. The second portion has a first side including a first attachment mechanism for slidably attaching to an attachment mechanism of the accessory. The second portion has a second side opposite the first side and including a second attachment mechanism for slidably attaching to an attachment mechanism of the protective case. One of the first attachment mechanism includes one of a female attachment interface and a male attachment interface and the second attachment mechanism includes the other of a female attachment interface and a male attachment interface.

In still another example, a protective case system includes a protective case for at least partially encasing an electronic device, an accessory for use with the electronic device, and a stand. The protective case has an outer shell that includes a first mounting feature. The accessory includes a second mounting feature configured to removably attach to the first mounting feature in a first configuration. The stand is configured to hold the protective case and the accessory in a second configuration. The stand includes a first portion configured to support the stand and a second portion extending upwardly from the first portion. The second portion has a first side including a third mounting feature and a second side opposite the first side including a fourth mounting feature. The third mounting feature is configured to removably attach to the first mounting feature and the fourth mounting feature is configured to removably attach to the second mounting feature in the second configuration.

FIG. 1 illustrates a protective case 100 for an electronic device. Exemplary protective cases are disclosed in US Patent Application Publication 2017/0017268, the disclosures of which are hereby incorporated by reference in their entirety.

Protective case 100 includes an inner liner 110 and an outer shell 120. Inner liner 110 provides the primary surface(s) for receiving and holding the electronic device in the protective case. Inner liner 110 may contact the electronic device on any one or more of a back surface, on one or more side surfaces, and/or on a portion of a front surface of the electronic device. In some situations, inner liner 110 may also be referred to as a cushion layer. Inner liner 110 can be made of any suitable material such as an elastomer. The elastomer may be, but is not limited to, a thermoplastic elastomer or silicone rubber. Inner liner 110 may comprise a material that is softer than a material of outer shell 120.

Inner liner 110 may be configured to cushion an installed electronic device from external forces, impacts, sudden acceleration, sudden deceleration, and other forces experienced at outer surfaces of protective case 100. Further, the compliant nature of inner liner 110 allows it to flexibly hold the electronic device to reduce movement, shifting, or rattling of the electronic device within protective case 100. Inner liner 110 may contain cavities, coring, reliefs, ribs, channels, recesses, a grid pattern, protrusions, and/or other similar features for holding the electronic device in place, for protecting the electronic device, dampening or distributing force, and/or for potentially reducing the surface area of contact between inner liner 110 and the installed electronic device.

Figure 2:
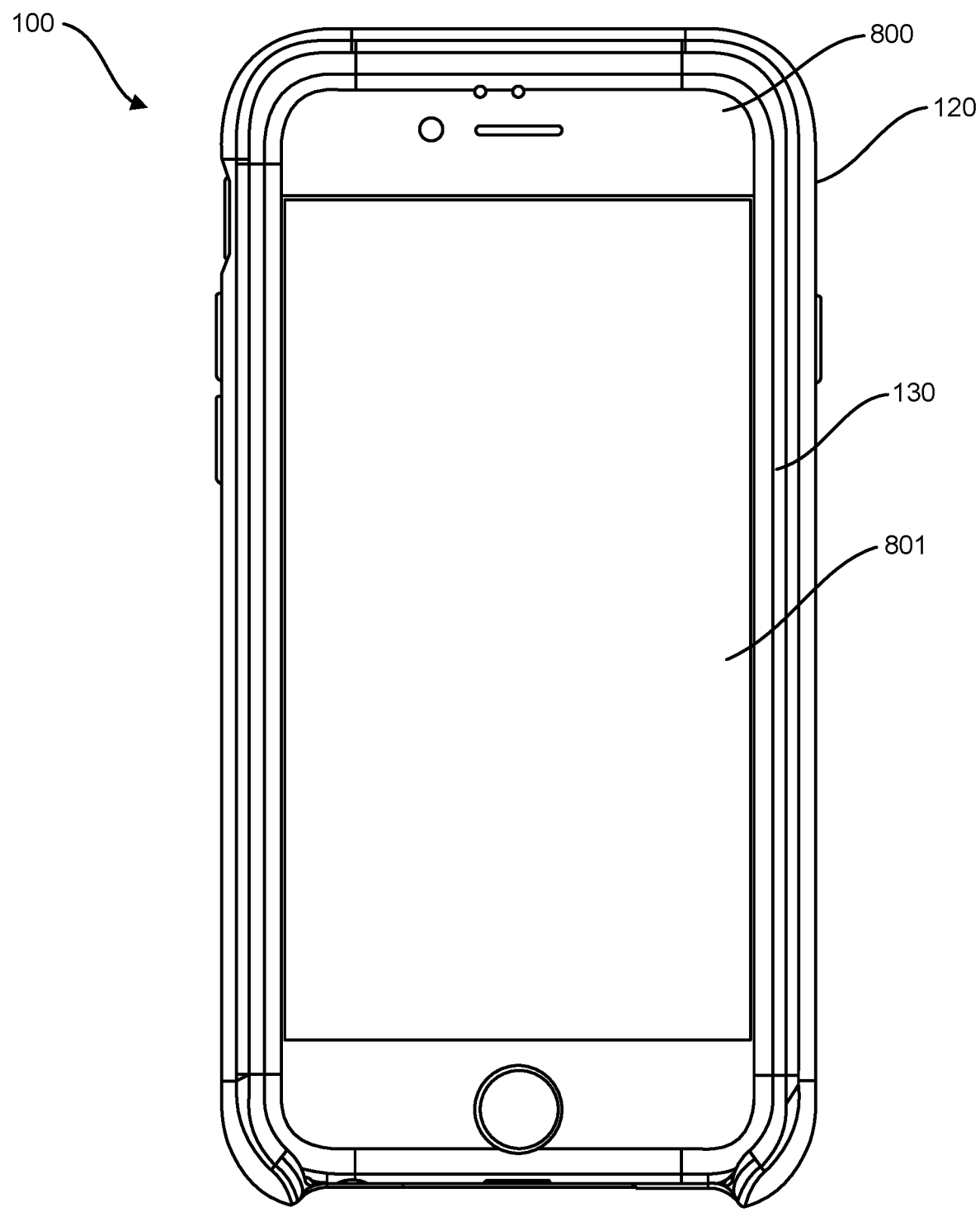
FIG. 2 illustrates a protective case with an electronic device installed.

As discussed in further detail with respect to FIG. 2, protective case 100 also includes aperture 130 which permits or allows access to at least some portion of the installed electronic device. In one example, aperture 130 permits access to an interactive interface of the electronic device such as a touch screen, a touch screen interface, a resistive touchscreen, and/or a capacitive touchscreen. Aperture 130 may contain a lip or edge that removably retains the electronic device in the protective case such that it does not easily or readily come out of the protective case, but can still be intentionally removed by a user when desired. Aperture 130 may also include a lip, ledge, protrusion, raised edge, rim, elevated rim, elevated protective rim, or other raised feature around at least a portion of aperture 130 to reduce the chances of a front surface of the installed electronic device from coming into contact with another object or surface, particularly when protective case 100 is laid face down on a flat surface, such as a table.

Protective case 100 also includes outer shell 120. Outer shell 120 may also be referred to as a structural layer, a frame, a rigid layer, a bottom shell, and/or a shell of protective case 100. Outer shell 120 extends around some or all of the outer surface of inner liner 110. Outer shell 120 will typically be manufactured from a material that is harder, more rigid, stiffer, more puncture resistant, more crush resistant, more chemical resistant, and/or more abrasion resistant than the material of inner liner 110. The material of outer shell 120 can be any suitable material such as a thermoplastic polymer or a synthetic polymer. The material can include polycarbonate, nylon, or glass filled nylon. Alternately, any other material, or combination of materials, that provide rigidity to protective enclosure 100 can be used. Outer shell 120 can be formed using any suitable process, such as an injection molding process. The back or sides of outer shell 120 may also include stylistic patterns, images, graphics, and/or colors.

Protective case 100 also includes aperture 140 in a back surface of protective case 100. Aperture 140 provides optical access and/or an optical path to/from a camera and/or a flash of an installed electronic device. In other words, aperture 140 permits use of the camera and/or flash even though the electronic device is installed in protective case 100 and much of the back of the electronic device is covered by protective case 100. Aperture 140 may be covered with a clear, mostly clear, transparent, or mostly transparent membrane or film that protects the camera and/or the flash but also still permits optical access and/or an optical path to/from the camera and/or flash. In some examples, the membrane or film may serve a lensing function and/or provide an optical effect.

Protective case 100 provides protection for an installed electronic device against external forces by reducing or eliminating transfer of those forces to the installed electronic device, as well as providing a relatively soft contact surface for the installed electronic device. The relatively soft contact surface can resist scratching, scraping, marring, and/or rub marks. While providing protection, protective case 100 enables a user to still use the electronic device while it is in protective case 100.

In one embodiment, one of inner liner 110 and outer shell 120 may be comolded (or co-molded) onto the other, comolded with the other, or overmolded onto the other. In another embodiment, they may be molded as separate pieces and adhered together after the molding process. In yet other embodiments, inner liner 110 and outer shell 120 may not be formed, molded, or adhered together but may fit together as an assembly. Inner liner 110 and outer shell 120 may have approximately the same thickness throughout protective enclosure 100 and in other embodiments can vary in thickness. The thickness can vary depending on the manufacturing process and/or the design of protective enclosure 100.

When inner liner 110 and outer shell 120 are formed, adhered, or removably fitted together, protective enclosure 100 may provide a one-piece construction that functions like, and provides benefits similar to, a more costly and possibly more complicated two-piece or three-piece assembly. However, it should be understood that the modular features of a protective case described herein are not to be limited to a protective case with an inner liner and an outer shell. It should be understood that the modular case improvements disclosed herein may be implemented in a case with a single layer (e.g., a hard rigid layer or a soft flexible layer), a case made of a single material (e.g., a polycarbonate, a silicone, etc.), a case made of a single component, a case with more than two layers, a case made of more than two materials, and/or a case made of more than two components. For example, the modular case improvements disclosed herein could be implemented into a clam shell case with two or more pieces, a sliding case with two or more pieces, a hinged case with two or more pieces, etc.

FIG. 2 illustrates protective case 100 with an electronic device 800 installed. Electronic device 800 includes touchscreen interface 801 that is partially or fully accessible by a user of the device through aperture 130 of protective case 100 when electronic device 800 is installed in protective case 100. Touchscreen interface 801 may also be referred to as a touch screen, a touch screen interface, a resistive touchscreen, a capacitive touchscreen, an interactive control panel, an interactive touchscreen, and/or the like. In some embodiments, protective case 100 may include a membrane or film that covers and/or protects some or all of touchscreen interface 801. The membrane or film may be partially or fully transparent such that touchscreen interface 801 is visible and operable through the film or membrane. In some embodiments, the membrane or film may be flexible. In other embodiments, the membrane or film may comprise a semi-rigid material or a rigid material, such as, for example, ruggedized glass.

Figure 3:
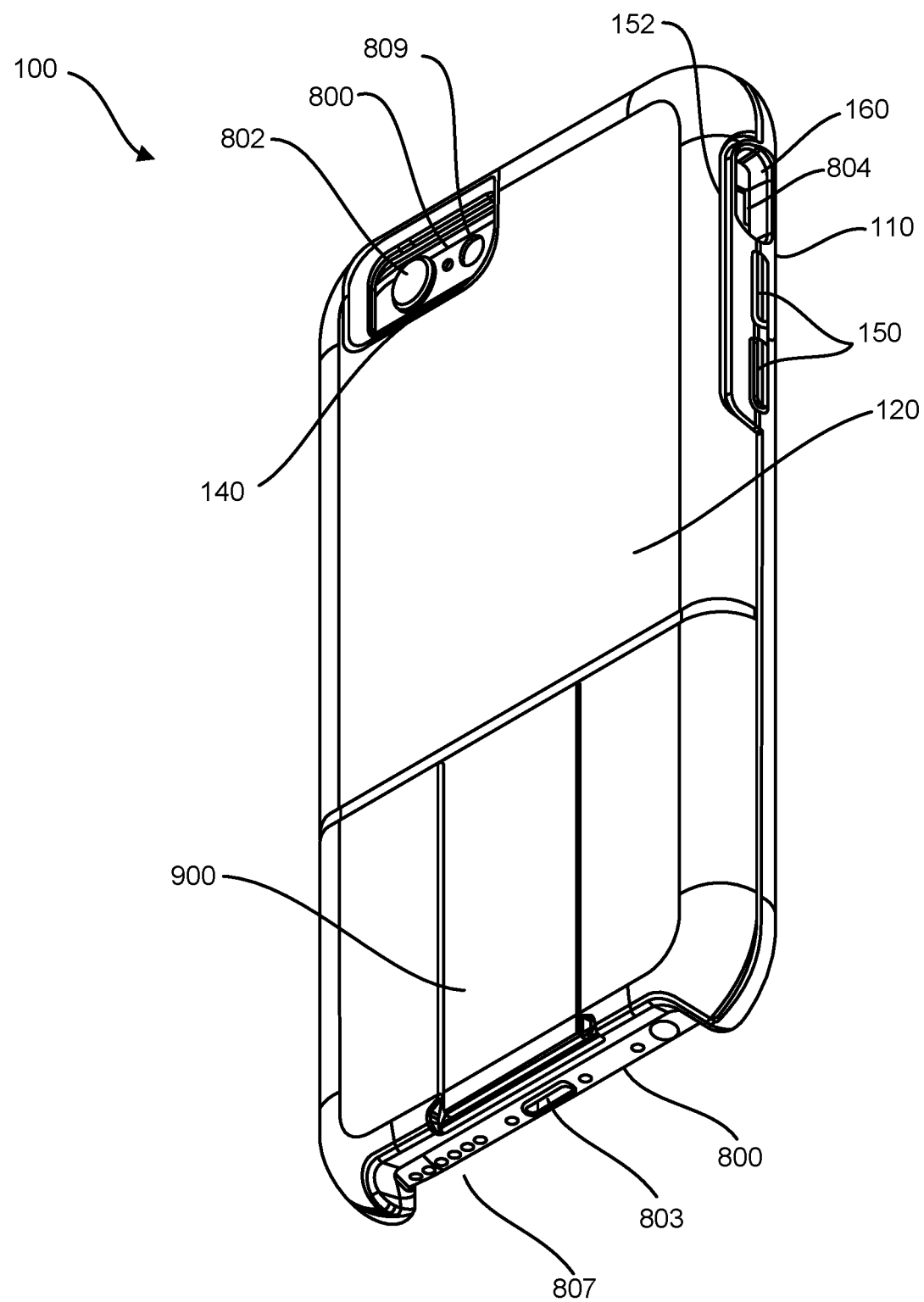
FIG. 3 illustrates a back perspective view of a protective case with an electronic device installed.

FIG. 3 illustrates a back perspective view of a protective case 100 with electronic device 800 installed. Outer shell 120 covers a majority of the back portion of protective case 100, although this configuration is not required. Protective case 100 includes aperture 140 through outer shell 120 and inner liner 110 to provide optical access to/from camera 802 of electronic device 800. Aperture 140 also provides optical access to/from flash 809 of electronic device 800. Additional apertures or openings may also be included for providing access to/from other features of electronic device 800 while it is installed in protective case 100. Aperture 140 may be partially or fully covered with a membrane or film that is partially or fully transparent. The membrane or film may protect components of electronic device 800, seal protective case 100, and/or provide one or more optical filtering or lensing effects for camera 802, flash 809, and/or for another component of electronic device 800. Protective case 100 may also include features for reducing an amount of reflection from flash 809 back into camera 802 and/or for reducing other undesirable optical effects.

As illustrated in FIG. 3, a side of outer shell 120 includes a cutout 152 through which inner liner 110 is accessible, extends, and/or protrudes. Cutout 152 of outer shell 120 may also be referred to as a recess, a cut back, or a relief in the side of outer shell 120. In some embodiments cutout 152 may also be implemented as an aperture in outer shell 120. Cutout 152 enables inner liner 110 to be accessible at or near an outer surface of outer shell 120 such that a feature may be formed in inner liner 110 and be accessible at the outer surface of outer shell 120 and/or from outside protective case 100.

In one example, button pads 150 are formed in inner liner 110 and accessible through cutout 152. Button pads 150 correspond to respective buttons or control features of installed electronic device 800. Because inner liner 110 is relatively soft and/or pliable, button pads 150 enable actuation or operation of the respective buttons or control features of installed electronic device 800 from outside of protective case 800 without necessarily having direct access to the buttons or control features. Outer shell 120 and/or inner liner 110 may also include an aperture or opening, such as aperture 160, for directly accessing a button, switch, or control feature of the installed electronic device, such as switch 804 of electronic device 800. Button pads and apertures may have many other shapes or configurations. A protective case may have more or fewer button pads or apertures than illustrated, or no buttons or apertures at all.

Electronic device 800 also includes external electrical interface 803. External electrical interface 803 may be for transmitting and/or receiving electrical data communication signals to/from electronic device 800. External electrical interface 803 may also be for supplying electrical power to and/or receiving electrical power from electronic device 800. External electrical interface 803 may include or may be configured to mate with a standardized electrical plug or connector such as, for example, a USB connector, a mini USB connector, a micro USB connector, an APPLE LIGHTNING® connector, a proprietary electronic connector, and/or an electrical connector of another type.

Protective case 100 may also permit access to other features of installed electronic device 800. For example, protective case 100 may permit access to an audio feature of electronic device 800, such as speaker 807 of electronic device 800. In some configurations, protective case 100 may include an aperture with a water impermeable membrane or fabric that allows sound to pass through the membrane while keeping water from passing through the associated aperture.

FIG. 3 also illustrates an accessory plate 900 installed on and removably attached to protective case 100. The features of accessory plate 900 and the way in which accessory plate 900 is attached to and removed from protective case 100 is described in further detail below.

Figure 4:
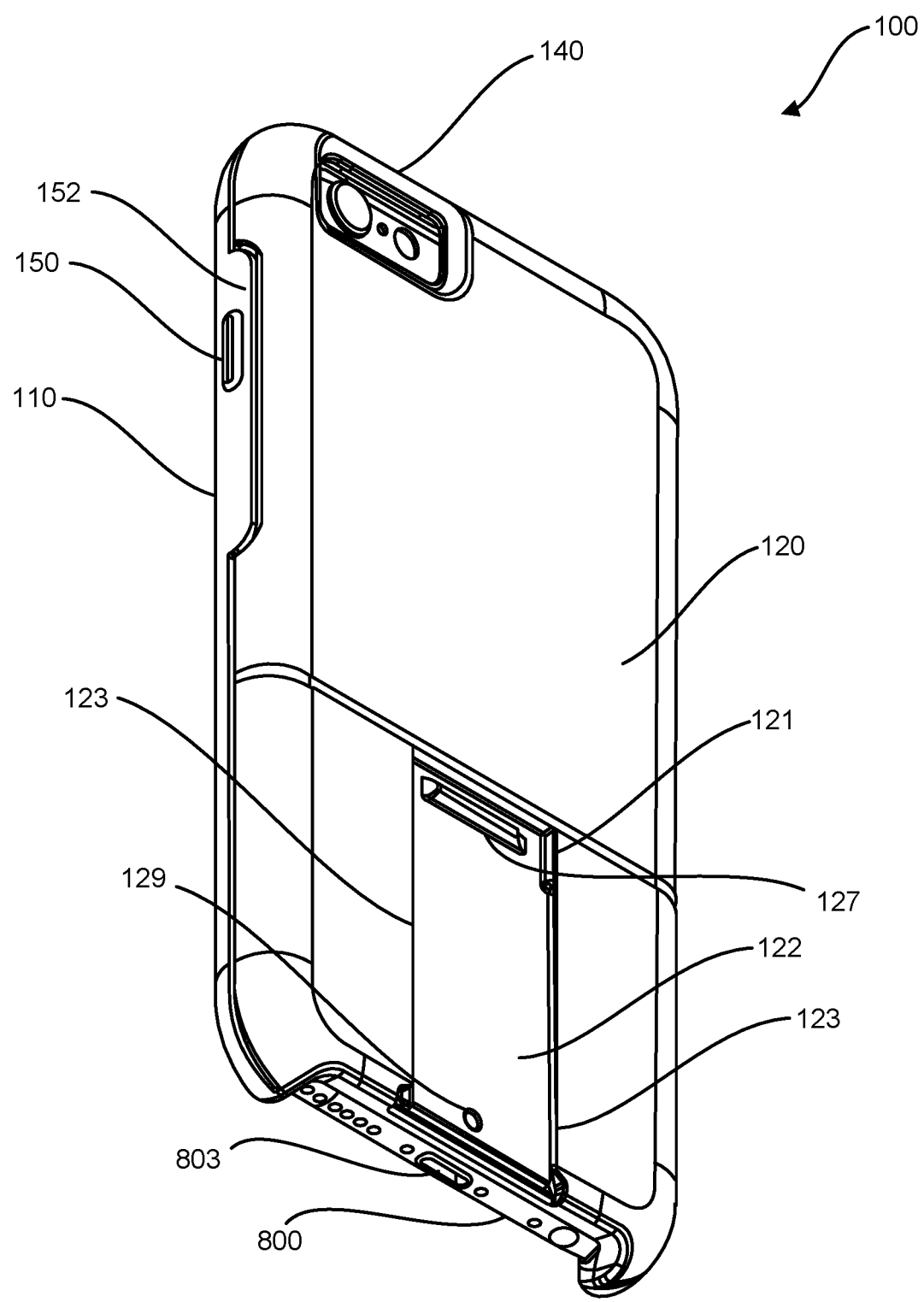
FIG. 4 illustrates another back perspective view of a protective case with an electronic device installed.

FIG. 4 illustrates another back perspective view of protective case 100 with electronic device 800 installed and without accessory plate 900 attached. FIG. 4 illustrates another cutout area 152 on another side of protective case 100. A cutout area, such as cutout area 152, can be included on any combination of sides of protective case 100. Protective case 100 also includes button pad 150. Many combinations of button pads and apertures, or no buttons or apertures at all, are possible depending on the particular locations of buttons, control features, switches, interfaces, and/or other features of any particular electronic device 800.

Features of protective case 100 for attaching an accessory, such as accessory plate 900, are also illustrated in FIG. 4. Attachment mechanism 121 collectively includes a variety of features or elements that may, in various combinations, be used to attach and retain an accessory to protective case 100. In the example of FIG. 4, attachment mechanism 121 includes receiver channel 122, lips 123, snap feature 127, and snap feature 129. Receiver channel 122 may include one or more slots, grooves, channels, tracks, rails, or other receiving features or areas for mechanically engaging and removably retaining an accessory. In the example of FIG. 4, receiver channel 122 is implemented in the form of a dovetail shaped slot into which an accessory slides. Receiver channel 122 includes lips 123 that bound or form the dovetail slot, retain the accessory, and allow it to be slid into attachment mechanism 121, and consequently into protective case 100, from one direction or along one axis while being retained or captured in other directions or in other axes. Other receiver channel shapes and configurations are possible.

In the example of FIG. 4, attachment mechanism 121 also includes snap feature 127 and snap feature 129. Snap feature 127 and snap feature 129 are for removably retaining or removably attaching an accessory to protective case 100. Although two snap features are illustrated, more or fewer snap features are possible. The snap features, individually or together, may have an interference fit with the accessory to removably retain the accessory in receiver channel 122 and/or may be configured such that they require overcoming an interference fit to insert or remove the accessory from receiver channel 122. The amount of interference and/or the characteristics of the snap features are selected such that the accessory does not accidentally dislodge from protective case 100 during normal use and handling, but also such that the accessory can be reasonably easily removed by a user when desired.

Snap feature 127 includes a ridge, bump, or protrusion that engages a corresponding snap feature, such as a groove, slot, or detent, of an accessory to removably retain the accessory in receiver channel 122. Snap feature 129 includes a ball, protrusion, detent, or recess that engages with a corresponding snap feature of the accessory to further removably retain the accessory in receiver channel 122. Other types, combinations, and numbers of snap feature are possible and the improvements disclosed herein are not to be limited to any type, combination, or number of snap features.

An accessory may electrically interface to an installed electronic device through its primary electrical connector, such as an APPLE LIGHTNING® connector, a micro USB connector, a mini USB connector, or the like. In other configurations, an accessory may electrically interface to an installed electronic device through another electrical connector, such as through a headphone jack. For example, an accessory may physically attach to a protective case using one or more of the techniques disclosed herein and electrically interface to a headphone jack of an installed electronic device. The accessory may be designed to have dimensions and orientation such that when the accessory is attached to the protective case an electrical interface of the accessory engages directly with an electrical interface of the installed electronic device. Beneficially, attaching the accessory to the protective case may also result in engagement of the electrical interfaces and the mechanical connection between the accessory and the protective case reduces or eliminates stress or strain on the electrical connections that may occur if no other mechanical connection between the accessory and the protective case was present. In some configurations, an accessory may electrically interface to more than one electrical interface of an installed electronic device.

In some configurations, an accessory attached to protective case 100 using the techniques disclosed herein may communicate with installed electronic device 800, and/or with other electronic devices, using wireless communication. For example, an accessory attached to protective case 100 may communicate with electronic device 800 or with electronics present on-board the protective case 100. Such communications may be uni-directional or bi-directional, direct or indirect (e.g., via a network), separate, multiple or concurrent, using a personal area network communications protocol (e.g., Bluetooth and/or Bluetooth Low Energy), a Near Field Communication (NFC) protocol, a Wireless Fidelity (e.g., Wi-Fi direct) protocol, a cellular communications protocol, a separate cellular communications protocol, an infrared communication protocol, and/or another type of wireless communication technique or protocol. In some situations, an accessory may interface to an electronic device through both a wired and a wireless connection, simultaneously or at alternate times. In some other situations, an accessory may interface with an electronic device through induction coils such as those implemented into wireless charging applications. The interface may involve transfer of electrical power, transfer or data communications, or both.

In some configurations, an accessory may communicate with, provide data to, receive data from, or otherwise interact with a software application (an app) running on one or more computer processors of the installed electronic device. The app may be included in software already installed on the electronic device, may be downloaded from a remote server over a network, and/or may be received by the electronic device from the accessory or from the protective case.

Some example of accessories that may electrically interconnect to an electronic device installed in protective case 100 or otherwise interact with the electronic device include: a camera accessory, a thermal imaging camera accessory, a sensor, an electronic measuring device, a stud finder, an audio device, a speaker, a video device, a solar charger, a supplemental battery, a memory card reader/interface, a medical monitor, a medical measuring device, a medical monitoring device, a biometric sensor, a breathalyzer, a game controller interface, a light source, a credit card reader, a bar code scanner, a wireless signal amplifier, a wireless signal booster, a kit of components, a wireless signal enhancer, and/or any other device or system that interacts with the electronic device through a wired and/or a wireless connection. An accessory which electrically interconnects to or interacts with an electronic device installed in a protective case may also have other features for interacting or connecting with other devices, through a wired and/or a wireless connection.

An accessory may also include a combination of electrical and mechanical functions and may include any combination of the electrical and mechanical features or functions described herein.

In some situations, an adapter or carrier may be used to adapt a module or accessory for use with protective case 100. In other words, the adapter may receive the accessory and the adapter may interface to protective case 100 using one or more of the techniques described herein. This approach may be useful when the accessory has not been designed or manufactured specifically to fit protective case 100 and/or when it may be desirable to use an accessory with a variety of cases or equipment that have different geometries and/or configurations. In this way, the accessory can be used with protective case 100 in the manners described herein without redesigning the accessory to fit protective case 100.

An adapter may designed to attach to protective case 100 using the techniques described herein and may include a receiving area or other mechanical interface for receiving and/or attaching an accessory to the adapter. The dimensions and geometry of the adapter may be chosen such that a connector of the accessory is in a preferred location relative to a connector of the installed device when the accessory is attached to the adapter and the adapter is attached to protective case 100. The accessory may attached to the adapter using any kind of fastener including: a snap, a clip, a screw, a bolt, a slot, adhesive, glue, and/or tape. The accessory may be attached to the adapter permanently or may be removable. In some configurations, the adapter may have a tray, recess, or slot fitted to the accessory to make it easier to properly position the accessory on the adapter.

Figure 5:
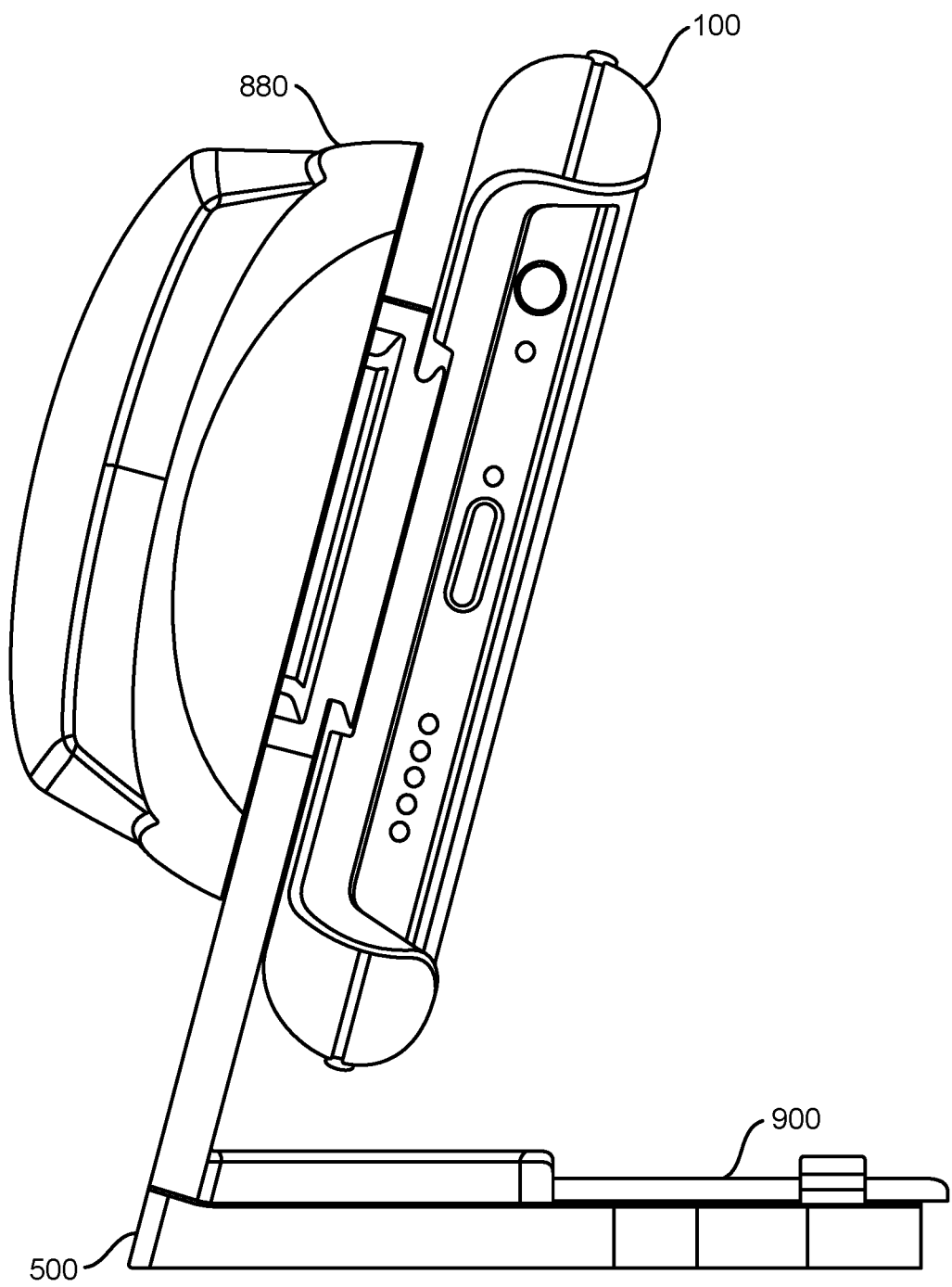
FIG. 5 illustrates a stand for use with a protective case and an accessory.

FIG. 5 illustrates a side view of a stand 500 for use with protective case 100 and with an accessory 880. In the example of FIG. 5, accessory 880 is an auxiliary audio speaker accessory for use with electronic device 800 in protective case 100. However, accessory 880 may be any type of accessory device for use with protective case 100 and/or with electronic device 800 inside protective case 100 as discussed elsewhere herein.

In some examples, accessory 880 may communicate or exchange data with electronic device 800 using wireless communication. Accessory 880 may be used to provide audio output for content playing on electronic device 800 in addition to, or in place of, speakers integral to electronic device 800. Accessory 880 may provide improved, higher quality, and/or higher volume than the integral speakers. As described in further detail below, accessory 880 may be attachable directly to protective case 100 using the techniques described herein. Specifically, accessory 880 may removably attach to protective case 100 at receiver channel 122. However, if accessory 880 is attached directly to protective case 100 and the user is not holding the devices, accessory 880 may be facing straight up from or directly down into a surface which the attached devices are sitting on.

Stand 500 provides for improved positioning of accessory 880 and/or protective case 100 such that preferred positioning can be maintained without a user having to hold the devices for extended periods of time. In FIG. 5, accessory 880 and protective case 100 are each separately attached to stand 500 using complementary mechanical interfaces which also allow accessory 880 and protective case 100 to be attached to each other (when stand 500 is not being used). In other words, stand 500 may utilize one or more features such as receiver channel 112, lips 123, snap feature 129, and/or snap feature 127 to provide an attachment interface for accessory 880. Further, stand 500 may utilize one or more complementary features of receiver channel 112, lips 123, snap feature 129, and/or snap feature 127 (such as may be found on accessory plate 900) to provide an attachment interface for protective case 100.

When stand 500 is sitting on a table or other surface, accessory 880 is held at a preferred angle relative to the table or other surface. The preferred angle being an angle other than facing into or directly out from the table or other surface. In the case of a speaker, accessory 880 is positioned to direct audio toward one or more people sitting or standing near the table or other surface on which stand 500 is sitting.

In the example of FIG. 5, stand 500 is configured such that accessory 880 points in a direction slightly above horizontal. In other words, accessory 880 points upward at a small angle (between zero and 45 degrees) relative to the table or surface on which stand 500 is placed. This positioning may be beneficial to direct the sound toward one or more people who are sitting or standing near the table or surface on which stand 500 is sitting. It should be understood that other configurations are possible which provide different mounting and viewing angles.

Protective case 100 may also be removably attached to stand 500. In the example of FIG. 5, protective case 100 is removably attached to stand 500. In other words, the same mechanical interfaces which allow accessory 880 and protective case 100 to be attached to each other also enable them to be each attached to stand 500. As described in further detail below, stand 500 includes complementary or inverse mechanical interfaces which are then compatible with the complementary mechanical interfaces of protective case 100 and accessory 880. In this way, accessory 880 and/or protective case 100 can be attached to stand 500 to be held in a preferred orientation or position, freeing the user to do other things. In addition, stand 500 includes a docking or storage location where accessory plate 900 can be removably stored such that it is not lost or misplaced when protective case 100 is attached to stand 500. Further, accessory 880 and protective case 100 can reattached to each other when not being used with stand 500.

FIG. 6A illustrates a perspective view of stand 500 with accessory 880 and protective case 100 attached. Stand 500 may comprise one, two, three, four, or more separate parts which can be assembled together in one or more different ways. In the example of FIG. 6A, stand 500 comprises a first stand portion 501 and a second stand portion 502. The two stand portions are removably, temporarily, or permanently attached together to form stand 500. In some configurations, stand 500 may also be disassembled for more compact storing or shipping.

Additional stand portions may be used to accomplish different configurations. For example, second stand portion 502 may be replaced with a different stand portion that results in a different mounting angle for accessory 880 and/or protective case 100. In another variation, second stand portion 502 may be replaced with another portion that provides a different mechanical interface for one or both of accessory 880 and protective case 100. In other words, different angles may be possible and the stand may be configured to optimize the mounting of angle of either protective case 100 or accessory 880.

Figure 6B:
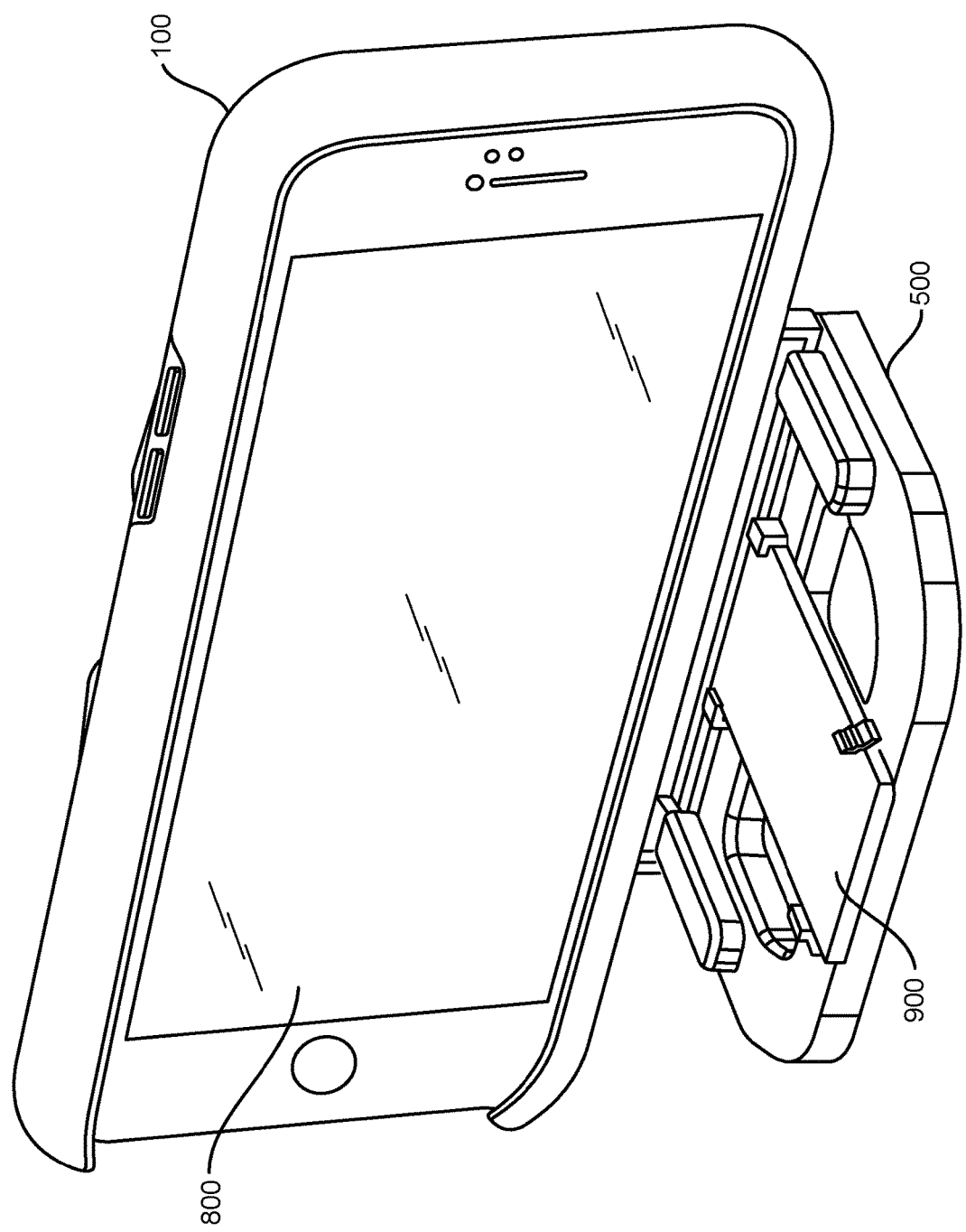
FIG. 6B illustrates an alternate perspective view of a stand with an accessory and a protective case attached.

FIG. 6B illustrates an alternate perspective view of stand 500 with protective case 100 attached (accessory 880 is not visible in FIG. 6B). FIG. 6B also illustrates the storing or stowing of accessory plate 900 on stand 500 such that it is not misplaced when not in use.

Figure 7A:
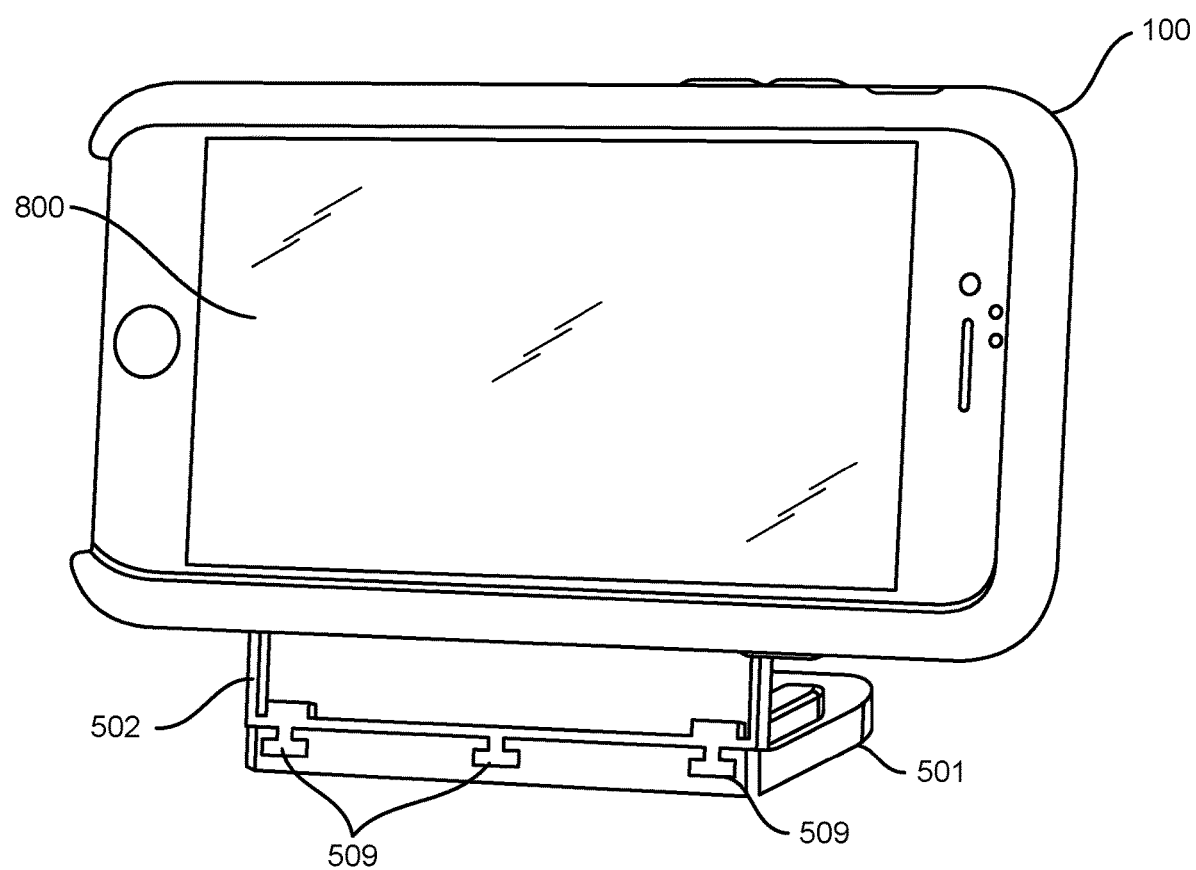
FIG. 7A illustrates a front view of a protective case installed on a stand.

FIG. 7A illustrates a front view of protective case 100 installed on stand 500. As in FIGS. 6A and 6B, stand 500 is made up of first stand portion 501 and second stand portion 502. However, protective case 100 is installed on stand 500 on a reverse side of stand 500 relative to FIG. 6A. In other words, protective case 100 is installed such that electronic device 800 is in a forward facing and slightly tilted back position which may be beneficial for a user view a movie, video, or other content on a screen of electronic device 800. First stand portion 501 is removably attached to second stand portion 502 using one or more attachment features 509. Second stand portion 502 may be flipped or reversed and installed in alternate directions on first stand portion 501 such that either the protective case side or the accessory side of second stand portion 502 is facing outward with the slightly tilted back position. In other configurations, second stand portion 502 may be replaced with other stand portions that provide different mounting angles, different mounting interfaces, and/or other features, including combinations thereof. In this way, stand 500 can be assembled in different ways for different types of uses and/or for different devices. A system may include a variety of stand components where all of the components are not necessarily used in any single configuration.

Figure 7B:
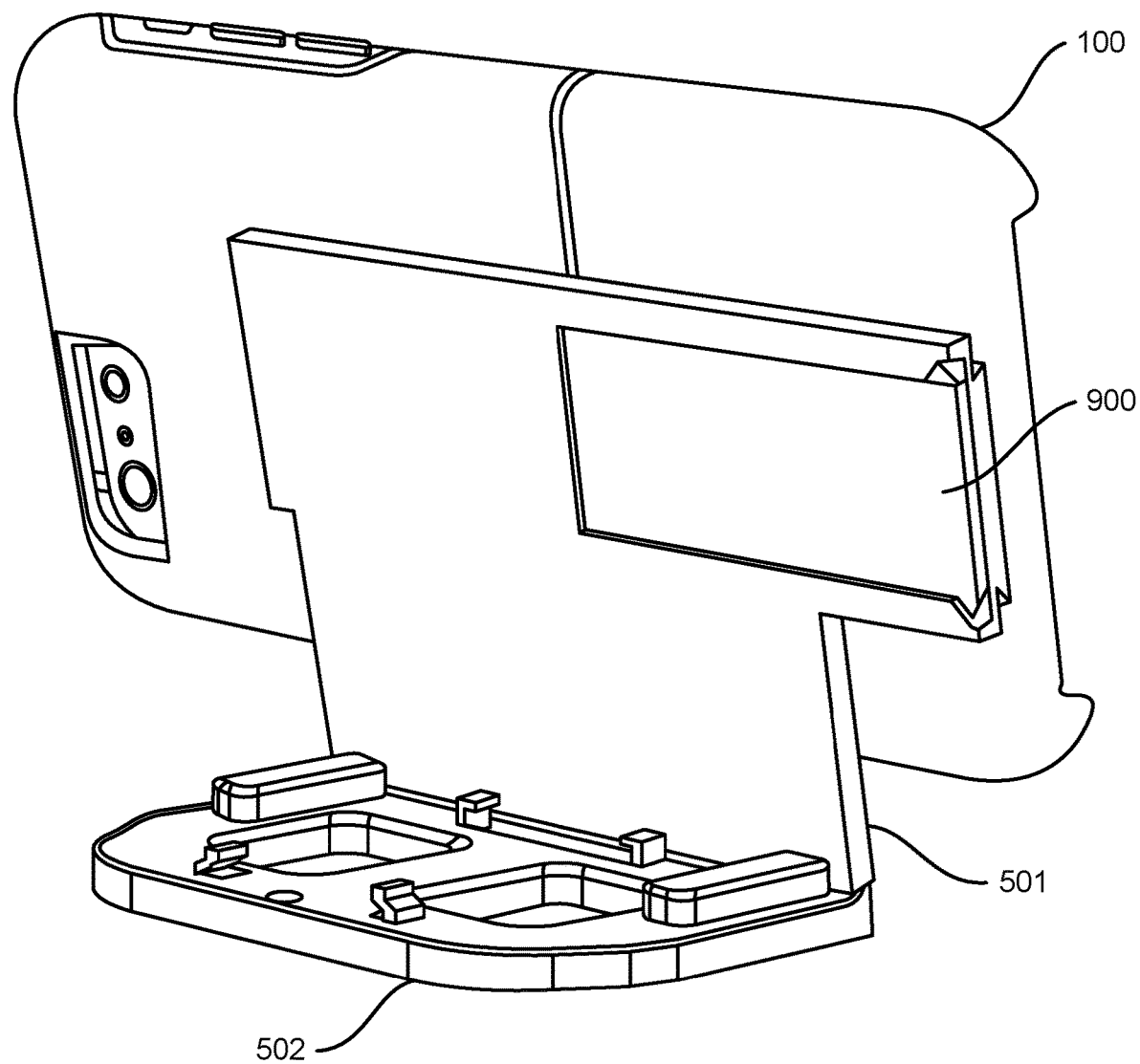
FIG. 7B illustrates a rear view of a protective case installed on a stand.

FIG. 7B illustrates a rear view of the configuration of FIG. 7A. In FIG. 7B, accessory plate 900 is stored in the temporarily unused mounting location that is used by accessory 880 in FIG. 6A. FIG. 8 illustrates an unassembled view of the components of FIGS. 6A and 6B. Specifically, FIG. 8 illustrates accessory 880 sliding onto stand 500 to be removably attached in a forward facing direction while protective case 100 slides onto and removably attaches to stand 500 in a rear facing direction. Further, accessory plate 900 is attached to stand 500 for stowing. Conveniently, all of the components are held together while positioning accessory 880 in a preferred pointing direction and while leaving a screen of electronic device 800 accessible for user interaction.

Figure 9A:
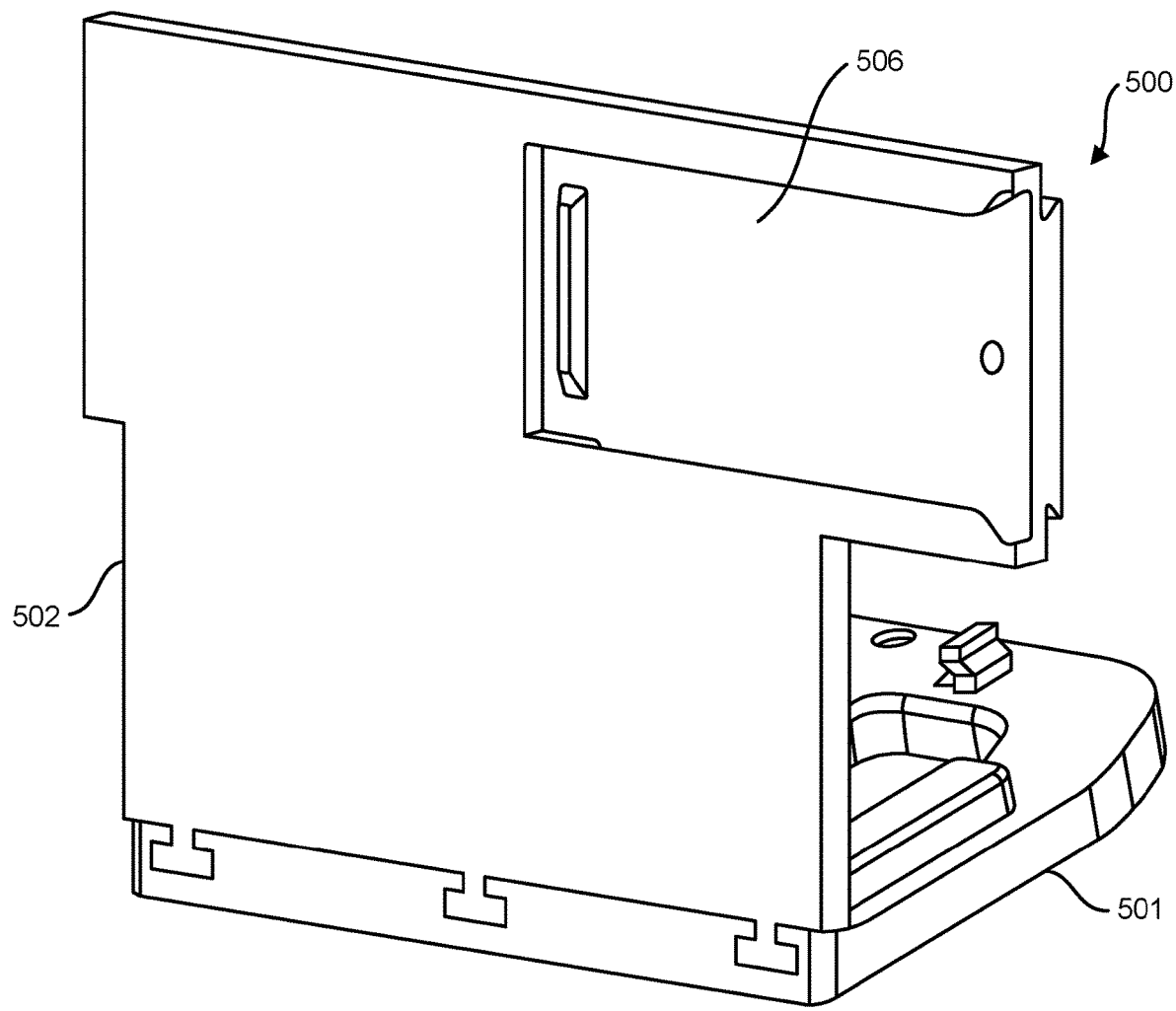
FIG. 9A illustrates the stand configuration of FIGS. 6A and 6B.

FIG. 9A illustrates the stand configuration of FIGS. 6A and 6B. The configuration of FIG. 9A provides attachment feature 506 on a forward facing portion of stand 500 for mating with a corresponding attachment feature accessory 880. Attachment feature 506 may be the same or similar as an attachment feature of protective case 100 and may comprise one or more of receiver channel 122, lips 123, snap feature 127, and/or snap feature 129.

Figure 9B:
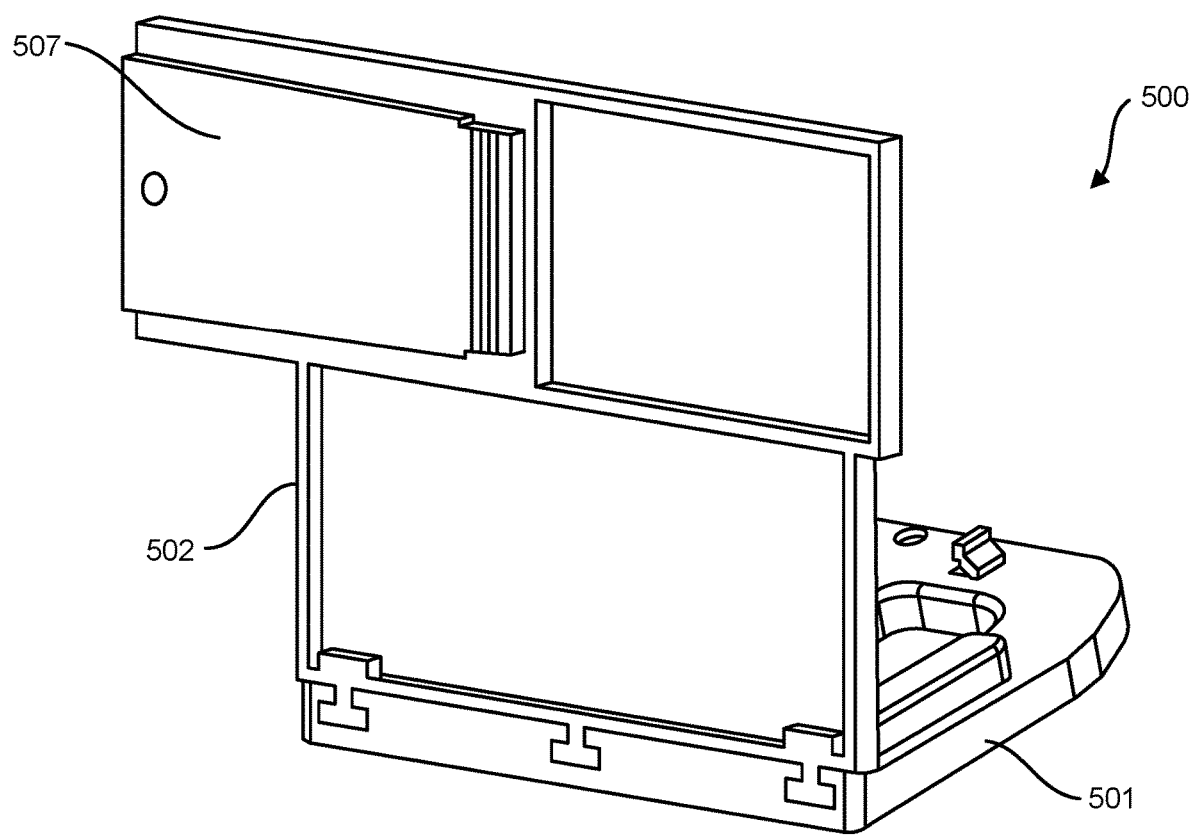
FIG. 9B illustrates the stand configuration of FIGS. 7A and 7B.

FIG. 9B illustrates the stand configuration of FIGS. 7A and 7B. In FIG. 9B, second stand portion 502 is reversed relative to first stand portion 501 such that attachment feature 507 is on a forward facing portion of stand 500. Attachment feature 507 is compatible with protective case 100 such that protective case 100 can be mounted for viewing of electronic device 100. Attachment feature 507 may include features that are the same or similar to feature on accessory plate 900 and/or accessory 880 for engaging with protective case 100.

Gender-type descriptors may also be used to describe the various attachment interfaces. In one example, protective case 100 and one side of stand 500 may have female attachment interfaces, while accessory 880 and the other side of stand 500 have male attachment interfaces. In the inverse example, protective case 100 and one side of stand 500 may have male attachment interfaces, while accessory 880 and the other side of stand 500 have female attachment interfaces. The male and female attachment interfaces may have any of the features disclosed herein.

Figure 10A:
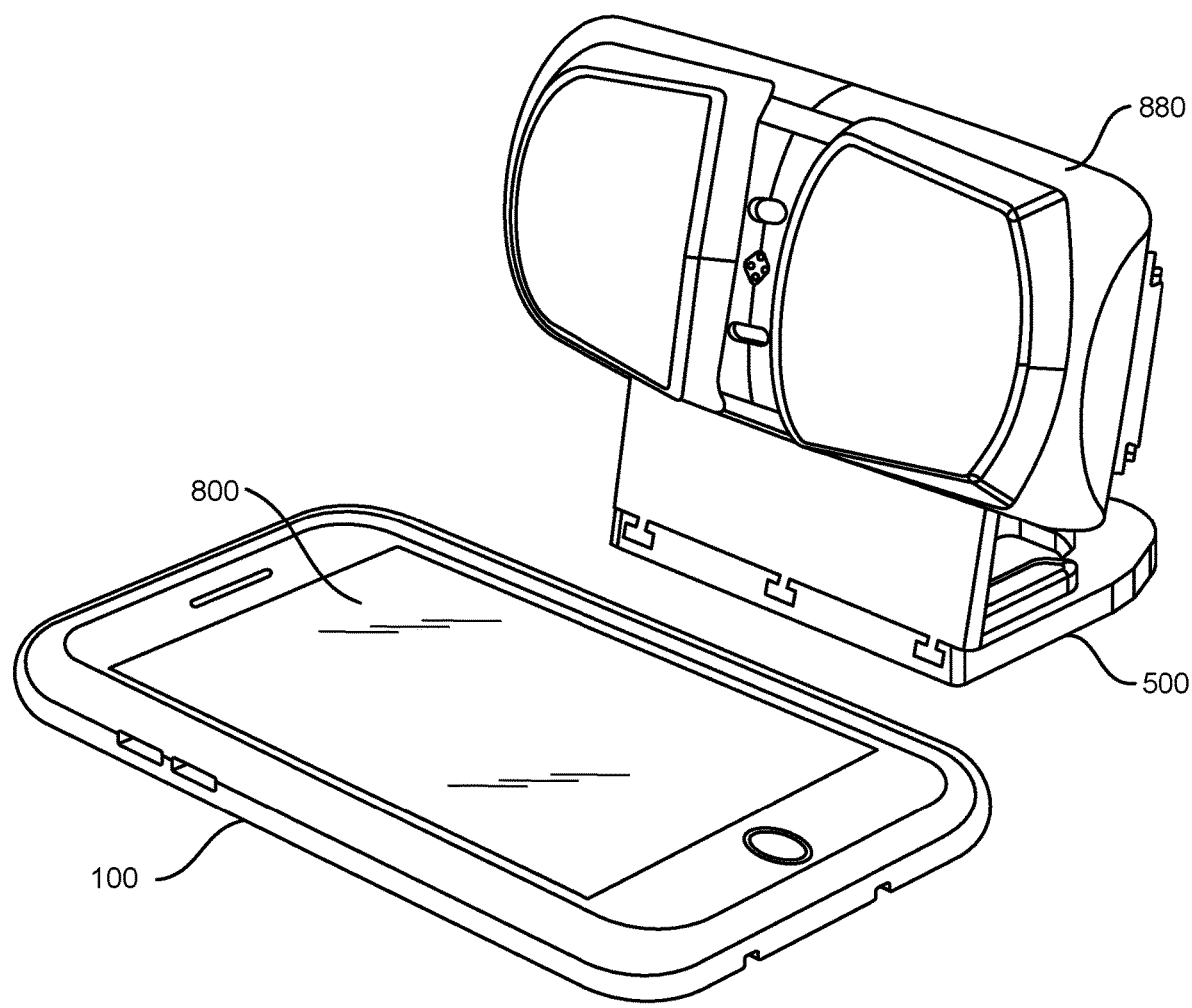
FIG. 10A illustrates an alternate configuration of a stand.

FIG. 10A illustrates an alternate configuration of stand 500. FIG. 10A illustrates a configuration similar to FIG. 6A, but without protective case 100 installed onto stand 500. In other words, stand 500 may be used for accessory 880 with or without protective case 100 attached.

Figure 10B:
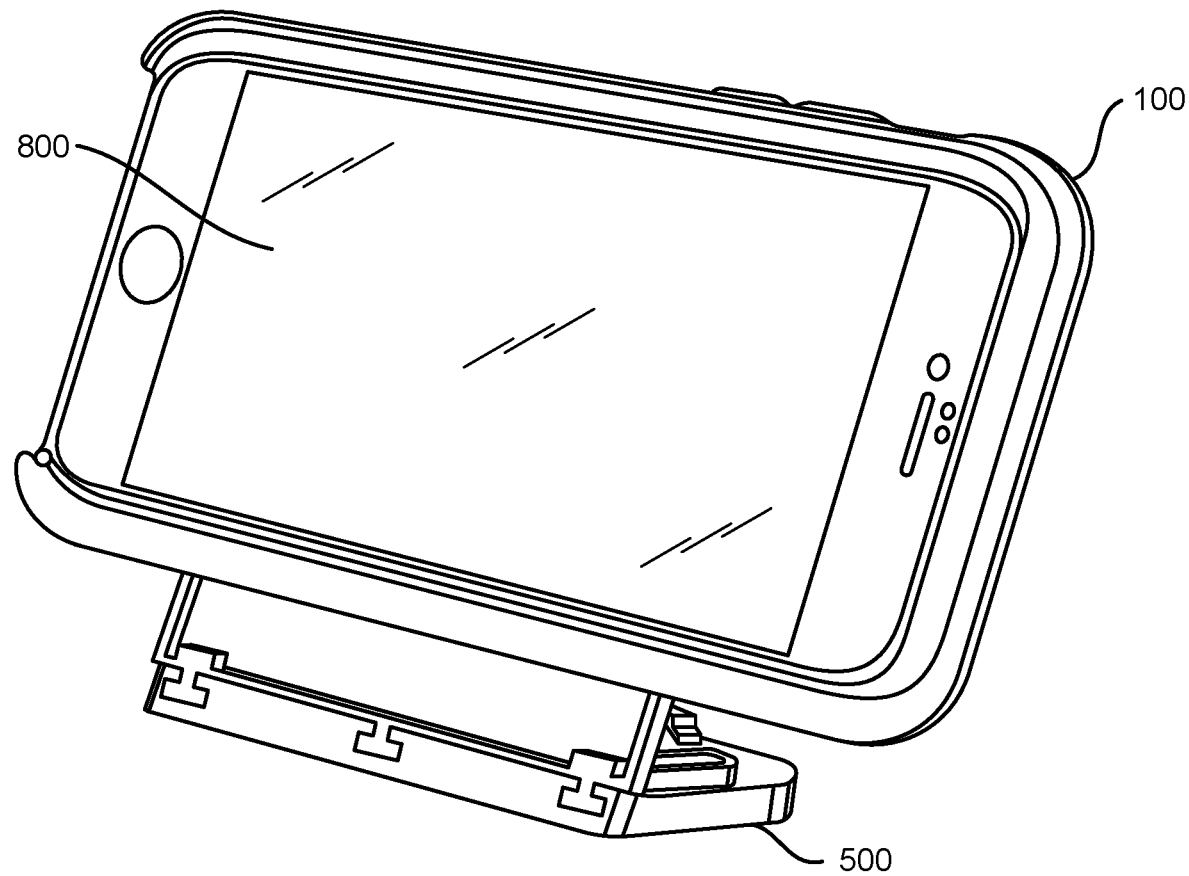
FIG. 10B illustrates an alternate configuration of a stand.
Figure 11:
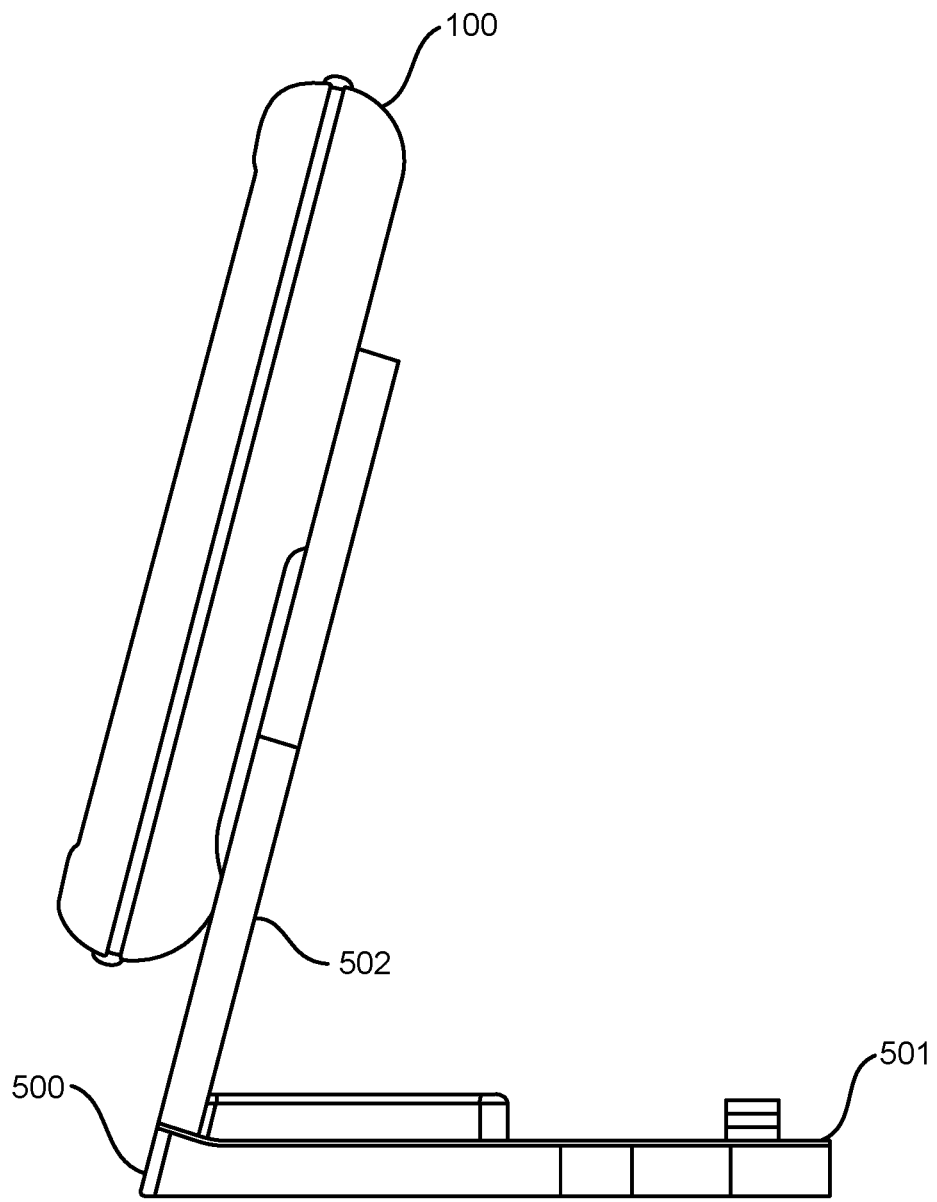
FIG. 11 illustrates a side view of a stand with a protective case installed.

FIG. 10B illustrates an alternate configuration of stand 500. FIG. 10B illustrates stand 500 being used for protective case 100, but without accessory 880 attached. FIG. 11 illustrates a side view of the protective case 100 and stand 500 of FIG. 10B.

The attachments between any of stand 500, accessory 880, and/or protective case 100 may or may not make use of engagement features, such as snap feature 127 and/or snap feature 129.

In other variations, stand 500 may include one or more electrical connectors, plugs, contacts, and/or jacks for establishing an electrical interconnection between accessory 880 and protective case 100 when one or both are installed on stand 500. In another variation, the one or more electrical connectors, plugs, contacts, and/or jacks may establish an electrical connection between one or more of accessory 880, protective case 100, and electronic device 800 to stand 500. In another variation, stand 500 may include electrical components and/or circuits for exchanging data, communications, and/or power with one or more of accessory 880, protective case 100, and/or electronic device 800, through a wired connection and/or wirelessly. Stand 500 may also be configured for exchanging data, communications, and/or power with another device, through a wired connection and/or wirelessly.

In one variation, stand 500 conveys electrical power to one or more of accessory 880, protective case 100, and electronic device 800, through a wired connection and/or wirelessly. In a further variation, the electrical power may be stored in a rechargeable battery of stand 500.

Any of the cases described herein may be used with or without one or more additional removable modules attached. Beneficially, a user may attach a module only when needed. In other examples, a stand may be configured for holding two or more modules using the techniques described herein. While stand 500 is described herein primarily with respect to accessory 880 and protective case 100, it should be understood that it may also be used with other accessories, devices, apparatuses, protective cases, cases, and/or covers.

In some examples, a removable module may be complementary to a function provided by the case. For example, a case may provide supplementary battery power to the electronic device while a removable battery module also contains a battery and provides even more supplementary power to the case and/or to the electronic device. Further, the removable battery module can be removed and temporarily replaced with a module having another functions such as, for example, a communication module supporting a communication protocol that differs from the electronic device, an infrared camera, or a biomedical monitor. Many other module functions are possible and the techniques disclosed herein are not to be limited to any particular type of module or module function.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described in the foregoing disclosure were chosen to explain the principles of the concept and its practical application to enable others skilled in the art to best utilize the invention. It is intended that the claims be construed to include other alternative embodiments of the invention, except as limited by the prior art.

What is claimed is:

1. A stand for supporting an accessory device and a protective case for an electronic device installed in the protective case, the stand comprising:
    a first portion for supporting the stand; and
    a second portion configured to releasably attach to the accessory device and to the protective case, the second portion having a first side including a first attachment mechanism for slidably attaching to an attachment mechanism of the accessory device and a second side opposite the first side and including a second attachment mechanism for slidably attaching to an attachment mechanism of the protective case, wherein the first attachment mechanism includes one of a female attachment interface and a male attachment interface and the second attachment mechanism includes the other of the female attachment interface and the male attachment interface, and wherein one of the first portion and the second portion of the stand includes a docking location configured to store a removable accessory plate of the protective case.

2. The stand of claim 1, wherein the first attachment mechanism includes the female attachment interface and the second attachment mechanism includes the male attachment interface.

3. The stand of claim 1, wherein the first attachment mechanism is the same as the attachment mechanism of the protective case and the second attachment mechanism is the same as the attachment mechanism of the accessory device.

4. The stand of claim 1, wherein the installed electronic device is in a forward facing and tilted back position when the protective case is attached to the second attachment mechanism.

5. The stand of claim 1, wherein the accessory device is in a forward facing and tilted back position when the accessory device is attached to the first attachment mechanism.

6. The stand of claim 1, wherein the first portion and the second portion are removably attached by one or more attachment features.

7. The stand of claim 6, wherein the stand is configurable between a first configuration wherein the installed electronic device is in a forward facing and tilted back position when the protective case is attached to the second attachment mechanism and a second configuration wherein the accessory device is in a forward facing and tilted back position when the accessory is attached to the first attachment mechanism.

8. The stand of claim 7, wherein the first configuration and the second configuration are distinguished by a reversal of the orientation of the second member.

* * * * *